United States Patent [19]
Hatakeyama et al.

[11] Patent Number: 5,794,065
[45] Date of Patent: Aug. 11, 1998

[54] DATA DRIVEN INFORMATION PROCESSOR

[75] Inventors: Kouichi Hatakeyama; Tsuyoshi Muramatsu, both of Nara, Japan

[73] Assignee: Sharp Kabushiki Kaisha, Osaka, Japan

[21] Appl. No.: 646,075

[22] Filed: May 7, 1996

[30] Foreign Application Priority Data

May 31, 1995 [JP] Japan .................................. 7-133997

[51] Int. Cl.$^6$ .............................. G06F 13/38; G06F 15/16
[52] U.S. Cl. ............................... 395/800.26; 395/200.77; 370/392
[58] Field of Search ................... 395/200.03, 800, 395/200.15, 200.16, 200.09, 200.11, 800.25, 800.26, 800.23, 200.66, 200.68, 200.77; 370/413, 364, 353, 406, 392, 423, 412, 471; 364/DIG. 1, DIG. 2, 606

[56] References Cited

U.S. PATENT DOCUMENTS

| | | | |
|---|---|---|---|
| 4,742,511 | 5/1988 | Johnson | 370/406 |
| 4,862,451 | 8/1989 | Closs et al. | 370/413 |
| 5,572,521 | 11/1996 | Pauwels et al. | 370/412 |

FOREIGN PATENT DOCUMENTS 6426236  1/1989  Japan.

*Primary Examiner*—Daniel H. Pan

[57] ABSTRACT

A data driven information processor capable of readily performing appropriate processing to input data according to their meanings includes a data packet forming portion forming a data packet having a tag including a generation number, a destination number, instruction information and a constant value based on externally input data. The data packet forming portion includes a generation number generation processing portion for generating a multi-dimensional generation number to be added to input data based on an order of the data and a destination number generation processing portion for generating a tag as a function of a generation number generated by the generation number generation processing portion. One of a generation number operation processing portion performing operation for each dimension of a generation number and a copy processing portion copying a portion of a generation number into a destination number, or both of these processing portions, may also be provided.

28 Claims, 23 Drawing Sheets

A : COLOR DIFFERENCE SIGNAL
B : CONTROL SIGNAL
C : LUMINANCE SIGNAL

FIG. 13

| | TAG | | |
|---|---|---|---|
| ADDRESSING ACCORDING TO TAG SELECTING CODE | DESTINATION NUMBER | INSTRUCTION | RIGHT DATA |
| 0 | 0X30 | nop | 0 |
| 1 | 0X22 | absrb | 5 |
| 2 | 0XF3 | add0 | 2 |

ADDRESSING ACCORDING
TO DATA NUMBER

| | TAG | | |
|---|---|---|---|
| | DESTINATION NUMBER | INSTRUCTION | RIGHT DATA |
| 0 | 0X30 | nop | 0 |
| 1 | 0X22 | absrb | 5 |
| 2 | 0XF3 | add0 | 2 |

FIG. 24

| GENERATION NUMBER | | | DATA NUMBER | TAG | | |
|---|---|---|---|---|---|---|
| FIELD | LINE | PIXEL | | DESTINATION NUMBER | INSTRUCTION | RIGHT DATA |
| 0 | 0 | 0 | 0 | 0X30 | nop | 0 |
| 0 | 0 | 0 | 1 | 0X22 | absrb | 5 |
| 0 | 0 | 0 | 2 | 0XF3 | add0 | 2 |
| 0 | 0 | 1 | 0 | 0X30 | nop | 0 |
| 0 | 0 | 1 | 1 | 0X22 | absrb | 5 |
| 0 | 0 | 1 | 2 | 0XF3 | add0 | 2 |
| 0 | 1 | 0 | 0 | 0X30 | nop | 0 |
| 0 | 1 | 0 | 1 | 0X22 | absrb | 5 |
| 0 | 1 | 0 | 2 | 0XF3 | add0 | 2 |
| 0 | 1 | 1 | 0 | 0X30 | nop | 0 |
| 0 | 1 | 1 | 1 | 0X22 | absrb | 5 |
| 0 | 1 | 1 | 2 | 0XF3 | add0 | 2 |
| 0 | 2 | 0 | 0 | 0X30 | nop | 0 |
| ⋮ | ⋮ | ⋮ | ⋮ | ⋮ | ⋮ | ⋮ |

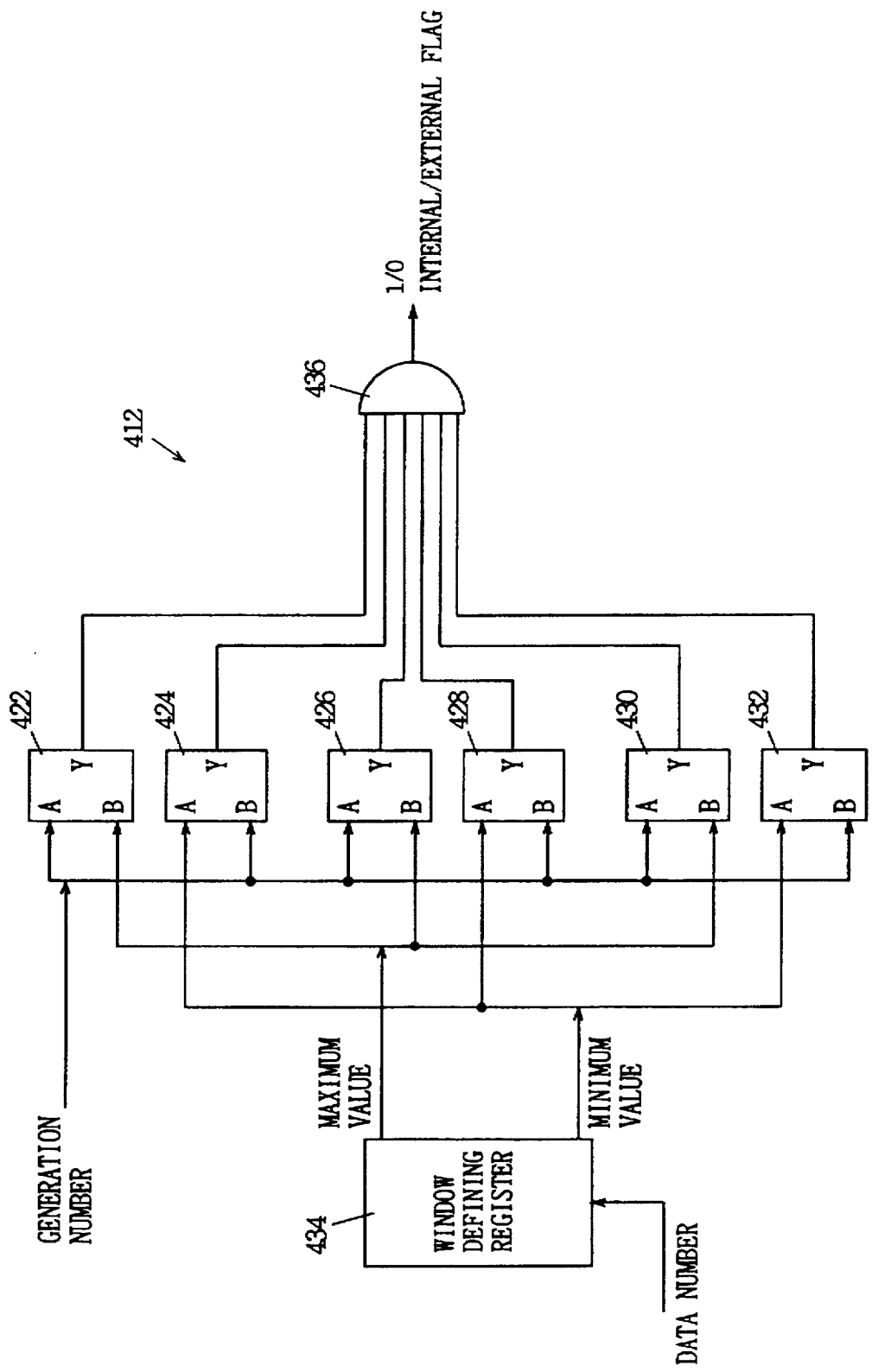

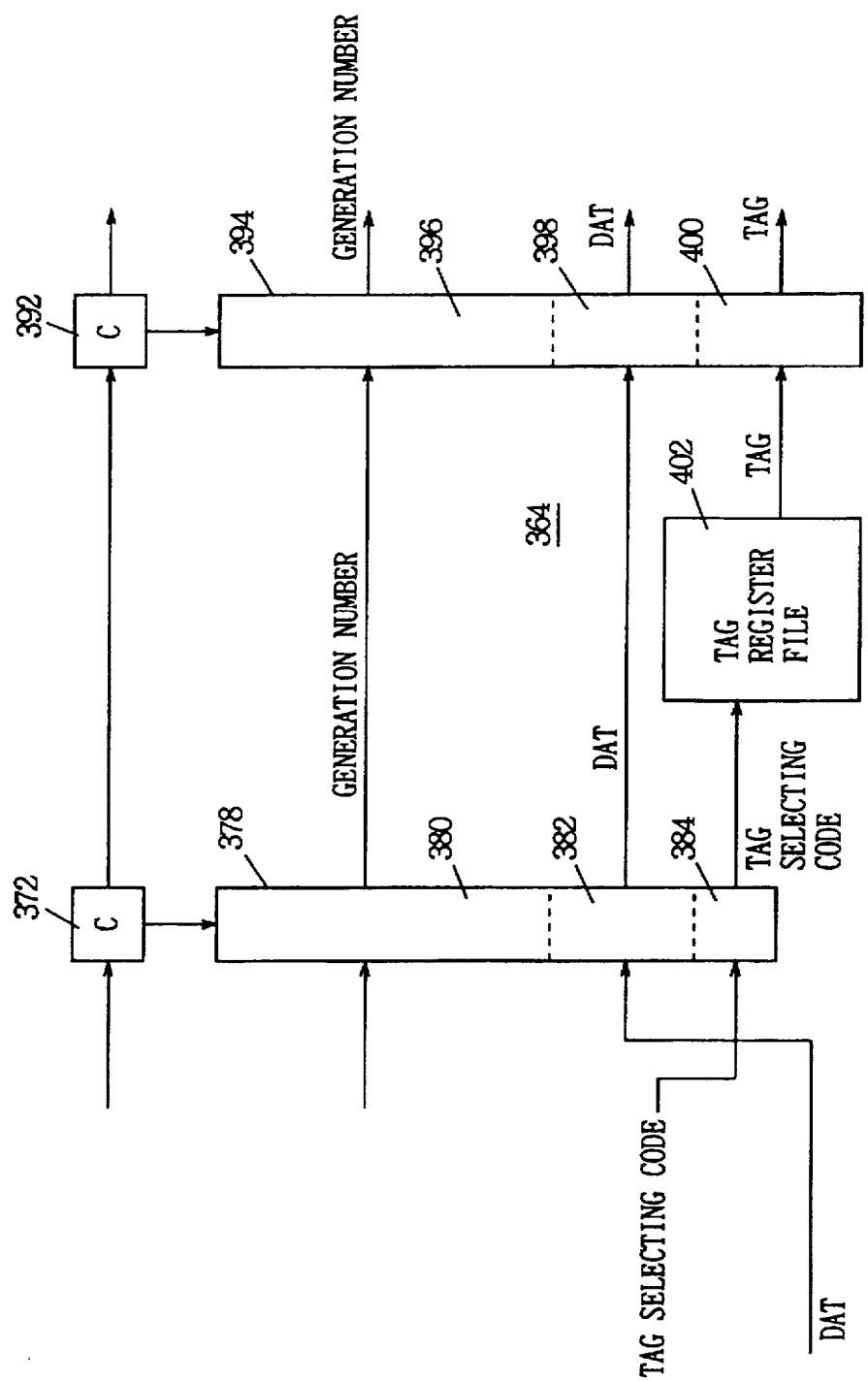

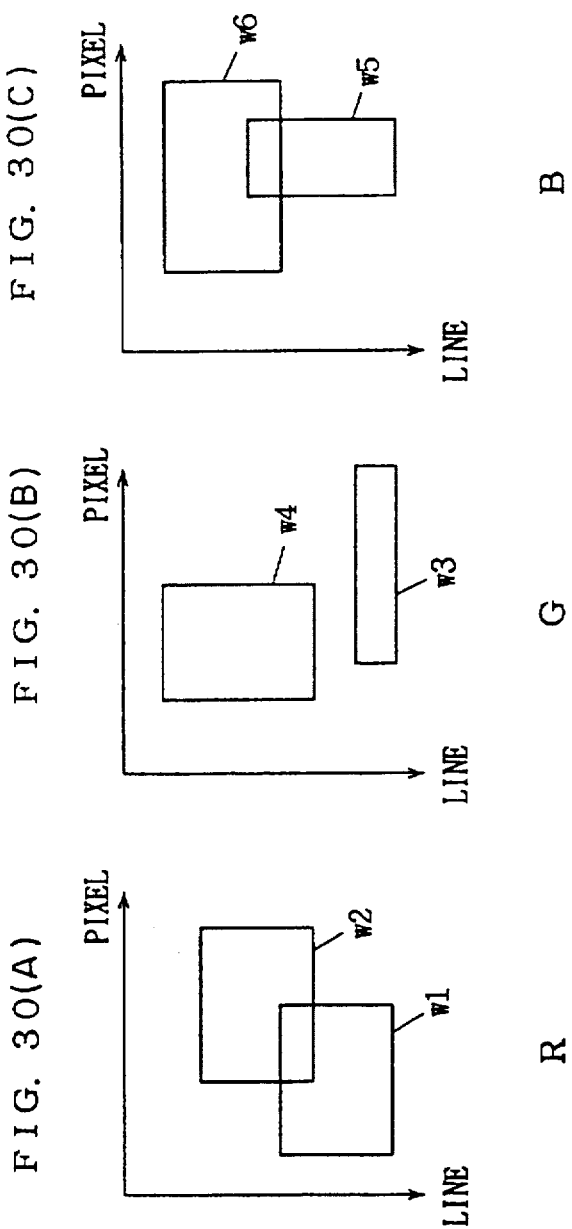

DATA DRIVEN INFORMATION PROCESSOR

BACKGROUND OF THE INVENTION

Cross Reference to Related, Copending Application

A related, copending application of particular interest to the present application is U.S. patent application Ser. No. 08/299,098 filed Sep. 2, 1994, entitled "Data Driven Information Processor Generating Multidimensional Generation Number", commonly assigned with the present application, now U.S. Pat. No. 5,630,151, issued on May 13, 1997.

FIELD OF THE INVENTION

The present invention relates to data driven information processors, and more particularly to a technique for automatically forming a data packet in response to data input to a data driven information processor and according to the order of input.

DESCRIPTION OF THE RELATED ART

A conventional von Neumann computer prestores various instructions as a program in a program memory. Addresses of the program memory are successively specified by a program counter and instructions are read out sequentially from the program memory to be executed.

On the other hand, a data driven information processor is one kind of von Neumann computers not having a concept of successive execution of instructions by a program counter. Such a data driven information processor employs an architecture based on parallel processing of instructions.

In the data driven information processor, as soon as data items to be subjected to operation are available, instructions can be executed. A plurality of operations are carried out simultaneously according to a flow of data. Since programs can be carried out in parallel according to a natural flow of data, it is expected that use of a data driven information processor significantly reduces the time required for operations.

Generally, in a data driven information processor, appropriate processing is performed on each data by sending out a data packet 532 shown in FIG. 5 to a pipeline. Data packet 532 includes a data portion in which data to be processed is stored and a tag portion in which destination information of the data is stored. The tag portion includes a generation number and a destination number.

The generation number is the number for distinguishing data groups to be processed in parallel from one another. The destination number is the number for distinguishing input data within the same generation.

Generally, it is data only, rather than a data packet, that is applied to the data driven information processor. Therefore, when data is input, a data packet the data driven information processor can handle need be formed. In forming a data packet, it is necessary to store input data in the packet as well as destination information corresponding to the data. How the destination information should be assigned is the problem and a method therefor is disclosed in Japanese Patent Laying-Open No. 64-26236 (entitled "Data Driven Computer").

According to the technique disclosed in this literature, as far as data are input to the data driven computer in a predetermined order, destination information is automatically added to the input data simply in response to the input of the data and processing results are output in a predetermined order, even if information of a destination address of the data or the like is not particularly applied.

Consider the case where an object to be processed by the data driven information processor is image information shown in FIG. 6, for example. Image information is generally considered three-dimensional data consisting of fields, lines and pixels. It is required to process the three-dimensional data on the basis of generations and on the basis of dimensions. In this case, it is convenient in processing an image, if a generation number is set to correspond to three dimensions, i.e., "fields, lines and pixels" and a multidimensional generation number according to the field, line and pixel of input data is generated.

When an object to be processed in the data driven information processor is image information, various processings need be executed depending on the type of image information. Consider the image shown in FIG. 1, for example. Referring to FIG. 1, in one image, data in the range of the region A may indicate a color difference signal, data in the range of the region B may indicate a control signal and data in the range of the region C may indicate a luminance signal. In such a data structure, different data processings need be performed on the data, depending on the range within which values of the line and pixel are in.

In other words, for each data, different pieces of destination information must be applied according to generation numbers. Conventionally, however, there has been no device capable of applying different pieces of destination information according to generation numbers and it has been impossible to perform such operations.

Furthermore, if input data is color data consisting of RGB, image information is as shown in FIG. 2. Referring to FIG. 2, a signal 502 is input in time series and there are three data of an R signal, a G signal and a B signal for each of the bits of the pixel data. Different processings need be performed on these signals. In other words, different pieces of destination information need be applied to R, G and B signals, respectively. On the other hand, however, R, G and B signals of one pixel belong to the same generation. Conventionally, it has been impossible to apply different pieces of destination information to data belonging to the same generation.

Furthermore, when an object to be processed is image data, the subsequent operations can be reduced if the region A shown in FIG. 1 is moved such that its upper left portion overlaps the upper left portion of the image (the origin), for example. Therefore, in applying data to a data driven information processor, such a function may be useful, which has not been implemented conventionally.

Furthermore, in a system employing a conventional data driven information processor, when a plurality of processors 512, 514, 516 and 518 shown in FIG. 3 are used to execute operations, the following problem occurs: for example, assume that the number of nodes is five, as shown in FIG. 4. When the above operations are executed in the system shown in FIG. 3, processings at first, second and third nodes are assigned to processors 512, 514, 516, respectively, and processings at fourth and fifth nodes are assigned to processor 518, as shown in FIG. 4. In such an assignment, when processing corresponding to a flow graph with nodes the number of which is not an integral multiple of the number of the processors is executed, some processors are required to be responsible for a greater amount of processing as compared with the other processors.

In the example of FIG. 4, the number of nodes assigned to processor 518 is twice the number of nodes assigned to each of the other processors. Accordingly, in a conventional data driven processor, processings cannot be distributed uniformly to each processor and the overall processing speed is undesirablly limited at the most heavily loaded processor.

SUMMARY OF THE INVENTION

One object of the present invention therefore is to provide a data driven information processor which allows easy and appropriate processing of input data according to their meanings.

Another object of the present invention is to provide data driven information processor which allows easy and appropriate processing of input data according to an order of the input.

Still another object of the present invention is to provide a data driven information processor which allows appropriate, easy and high-speed processing of input data according to their meanings.

Still another object of the present invention is to provide a data driven information processor which allows appropriate processing of input data according to their meanings and which facilitate allocation of processings to a plurality of processors uniformly.

Still another object of the present invention is to provide a data driven information processor which allows appropriate, easy and high-speed processing of input data by generating appropriate tags according to generation numbers of the input data.

A data driven information processor according to the present invention processes input data according to a data flow program including destination information and instruction information. The destination information includes a generation number for distinguishing groups of data from one another and a destination number for distinguishing data within the same group of data. The data driven information processor includes: a data packet forming unit for forming according to externally applied input data a data packet having a tag including a generation number, a destination number, instruction information and a constant value and the input data; a program storing unit for storing therein a data flow program and for reading out packet instruction information and a next destination information from the stored data flow program according to destination information included in an applied data packet and adding the same to the applied data; a composite data generating unit for receiving a data packet output from the program storing unit and generating a composite data packet including an instruction for which all data required for execution of the instruction are available, data required for execution of the instruction and destination information included in the data packet containing the instruction; an operation processing unit for operating on data included in a composite data packet output from the composite data generating unit according to instruction information included in the composite data packet output from the composite data generating unit and for outputting a data packet including the operation result; and an output unit for receiving a data packet output from the operation processing unit and a data packet output from the data packet generating unit and selectively outputting each data packet to the program storing unit or the outside according to destination information included in each data packet.

The data packet forming unit includes: a generation number generating unit for generating a multi-dimensional generation number to be added to input data according to an order of the data; a tag generating unit for generating a tag as a function of a generation number generated by the generation number generating unit; and a data combining unit for combining a tag generated by the tag generating unit with the input data to assemble a data packet for application to the output unit.

In the data driven information processor thus configured, a generation number generating unit generates a multi-dimensional generation number to be added to input data according to an order of the data. A tag generating unit generates a tag as a function of a generated generation number. A data combining unit combines a tag generated by the tag generating unit with input data to assemble a data packet and applies the data packet to an output unit. Since the tag is a function of a generation number, destination can be changed according to generation numbers. Different processings can be applied to data of different generations. When meanings of data are different depending upon their generation numbers, appropriate processing for each of data can be executed.

In a preferred embodiment, the tag generating unit includes a tag storing unit for storing therein a plurality of types of tag information associated with at least a portion of the generation number and for outputting tag information associated with at least a portion of an applied generation number when the portion of the generation number is applied.

A tag can be easily generated by prestoring in the tag storing unit tag information associated with at least portions of generation numbers. Easy and appropriate processing can be performed on input data according to their meanings.

In another embodiment, the generation number generating unit also generates separate data numbers for a plurality of data belonging to the same generation. The tag generating unit includes a tag storing unit for storing therein a plurality of types of tag information associated with the data numbers and for outputting tag information associated with an applied data number when the data number is applied from the generation number generating unit.

In a device thus configured, separate data numbers are generated for a plurality of data belonging to the same generation, respectively. When a data number is applied to the tag storing unit, it outputs tag information associated with the applied data number. Since the tag information is applied according to an input order of the data, different destination information can be included in the tag information according to the input order of the data and each of the data can be appropriately allocated. When meanings of data are different depending upon the order of the data, appropriate processing for each of the data can be executed.

In still another embodiment, the generation number generating unit generates separate data numbers for a plurality of data belonging to the same generation, respectively. The tag generating unit includes a tag storing unit for storing therein a plurality of types of tag information associated with generation and data numbers and for outputting tag information associated with generation and data numbers when the generation and data numbers are applied from the generation number generating unit.

Separate data numbers are generated for a plurality of data belonging to the same generation. When generation and data numbers are applied from the generation number generating unit to the tag storing unit, the tag storing unit outputs tag information associated with the applied generation and data numbers. Since the tag information is applied according to a generation number and an input order of data, different destination information can be included in the tag information according to a value of the generation number and the input order of the data. Easy and appropriate processing can be performed on input data by allocating the input data to appropriate designations according to their meanings.

A data driven information processor of still another preferred embodiment also includes a copying unit connected with an output of the tag generating unit and an output of the generation number generating unit for copying a predetermined portion of a generation number output from the generation number generating portion into at least a portion of a destination number of tag information generated by the tag generating unit.

Thus, in this device, the predetermined portion of a generation number output by the generation number generating unit is copied into the portion of a destination number of tag information generated by the tag generating unit. Therefore, the destination information can be changed according to the generation number. When distribution of generation numbers is uniform, distribution of destination information generated becomes uniform. Because destinations are well distributed, loads will not concentrate at certain part of resources for processing information and the resources can be effectively utilized. Consequently, overall processing at high speed can be achieved.

More preferably, a data driven information processor also includes a converting unit which converts a generated generation number by executing a predetermined operation for each dimension. The generated generation number is converted by executing a predetermined operation for each dimension. When each dimension of a generation number has a different meaning, converting of the generation number in which each meaning is taken into consideration can be readily performed, and such a conversion relaxes a load of the subsequent operations.

Another aspect of the present invention is a data driven processor including: a data packet forming portion generating a data packet having a tag including at least destination information and input data in response to external input of the data; a program storing portion adding to a data packet an instruction and a next destination information determined according to a tag of the data packet and a predetermined program, respectively when the data packet is applied thereto; a paired data generating portion for receiving a data packet from the program storing portion and forming a composite data packet including an instruction for which all data required for execution of the instruction are available, data required for the execution and destination information of a result of the execution; an operation processing portion executing an instruction in a composite data packet from the paired data generating portion and outputting a data packet including an operation result and destination information of the operation result; and an input/output controlling portion for receiving a data packet from the operation processing portion and a data packet from the data packet forming portion and selectively outputting each data packet to the program storing portion or to the outside according to destination information included in each data packet. The data packet forming portion includes: a generation number generation processing portion for generating a multi-dimensional generation number to be added to input data according to an order of data; a data generation processing portion for generating a tag as a function of the multi-dimensional generation number generated by the generation number generation processing portion; and a data combination processing portion for combining a tag generated by the tag generation processing portion with input data to assemble a data packet and providing the data packet to the input/output controlling portion.

In the data driven processor thus configured, the generation number generation processing portion generates a multi-dimensional generation number to be added to input data according to an order of the input data. The tag generation processing portion generates a tag as a function of the generated generation number. The data combination processing portion combines the tag generated by the tag generation processing portion with the input data to assemble a data packet and applies the data packet to the input/output controlling portion. Since the tag is a function of a generation number, the destination can be changed according to the generation number. Different processing can be performed on data of a different generation. When a meaning of data is different depending on the generation number, appropriate processing can be performed on each of data.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 is schematically shows a configuration of a tag register file.

FIG. 23 schematically shows a configuration of a tag register file.

FIG. 24 shows the relation of generation numbers, data numbers and tags generated by a data driven information processor of the second embodiment of the present invention in the form of a table.

FIG. 28 is a block diagram of a comparing portion.

FIG. 29 is a block diagram of a tag generation processing portion.

FIGS. 30A–C schematically shows windows separately defined for a R signal, a G signal and a B signal in a data driven information processor of the third embodiment, respectively.

DESCRIPTION OF THE PREFERRED EMBODIMENTS

[First Embodiment]

A first embodiment of the present invention will now be described. The first embodiment has a function of generating a different tag (destination information, instruction information, a constant data value) according to a generation number and after performing an operation for each dimension of the generation number, copying a portion of the generation number into a destination number.

Figure 7:
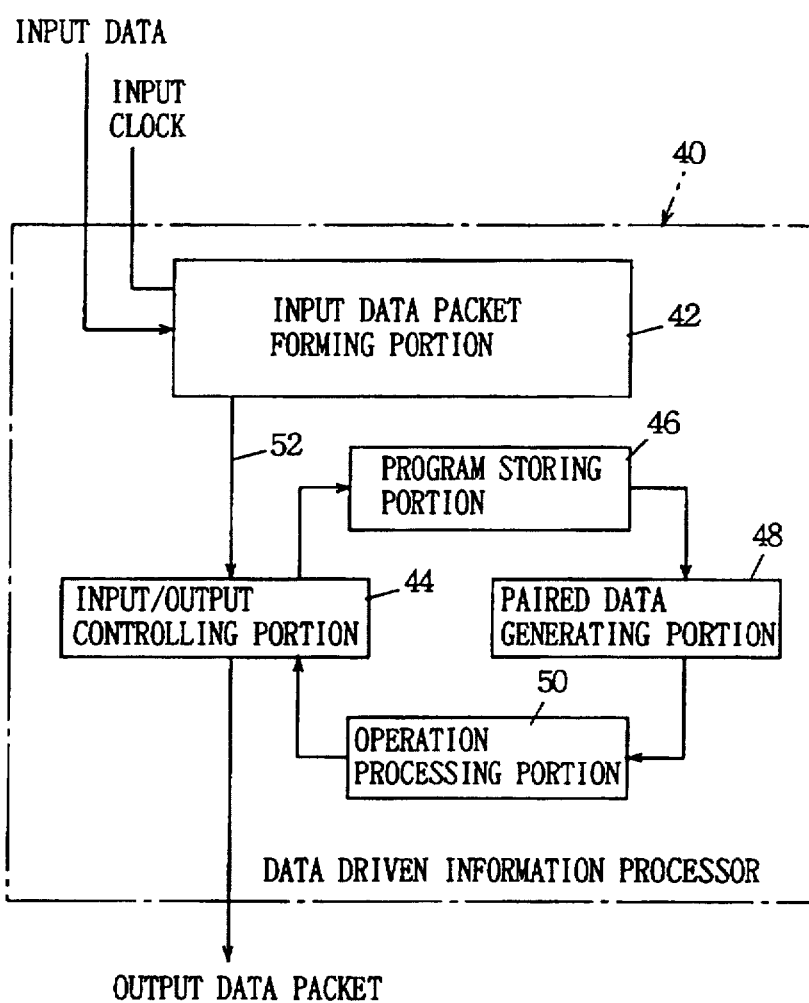
FIG. 7 is a block diagram showing the entire configuration of a data driven information processor according to a first embodiment of the present invention.

Referring to FIG. 7, the entire configuration of a data driven information processor 40 according to an embodiment of the present invention is similar to conventional devices, and it includes: a data packet forming portion 42 externally receiving input data and an input clock and forming a data packet having a tag including a generation number, a destination number, instruction information and a constant value, and the input data in response to input of the data; a program storing portion 46 for storing therein a data flow program and reading out instruction information and a next destination information from the stored data flow program according to destination information included in an applied data packet and adding the same to the applied data packet; a paired data generating portion 48 for receiving a data packet output from program storing portion 46 and forming as a composite data packet a data packet including an instruction for which all data required for execution of the instruction are available, data required for execution of the instruction and destination information included in the data packet including the instruction; an operation processing portion 50 operating on data included in a data packet output from paired data generating portion 48 according to instruction information included in the data packet output from paired data generating portion 48 and outputting a data packet including an operation result; and an input/output controlling portion 44 for receiving a data packet output from operation processing portion 50 and a data packet output from input data packet forming portion 42 and selectively outputting each data packet to program storing portion 46 or the outside of data driven information processor 40 according to destination information included in each data packet.

Figure 8:
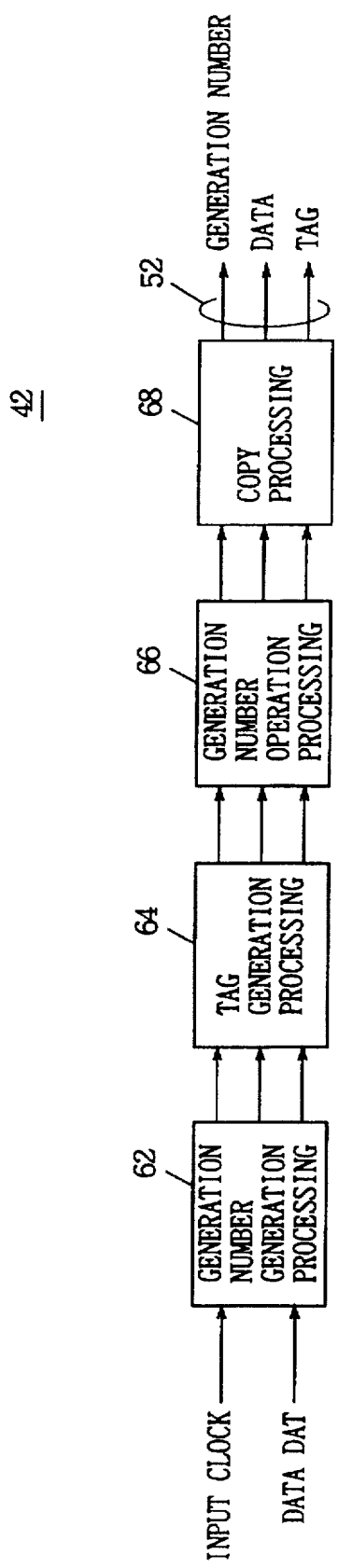
FIG. 8 is a block diagram of the input data packet forming portion shown in FIG. 7.

Referring to FIG. 8, data packet forming portion 42 includes a generation number generation processing portion 62 for receiving an input clock and input data DAT and generating a multi-dimensional generation number to be added to the data according to an order of the input data, a tag generation processing portion 64 for generating a tag as a function of a generation number generated by generation number generation processing portion 62, a generation number operation processing portion 66 as a converter means for converting a generation number generated by generation number generating processing portion 62 by performing a predetermined operation for each dimension of the generation number, and a copy processing portion 68 for copying at least a portion of a generation number output from generation number operation processing portion 66 into a destination number of a tag. An output of copy processing portion 68 is a data packet 52 having a tag portion including of a generation number, a destination number and data. Data transfer between processing portions 62, 64, 66 and 68 and data transfer within each of these data processing portions are performed by pipeline registers and transfer control elements (C elements) which successively transfer data stored within the pipeline registers to subsequent pipeline register according to transfer control signals based on the input clock.

Figure 9:
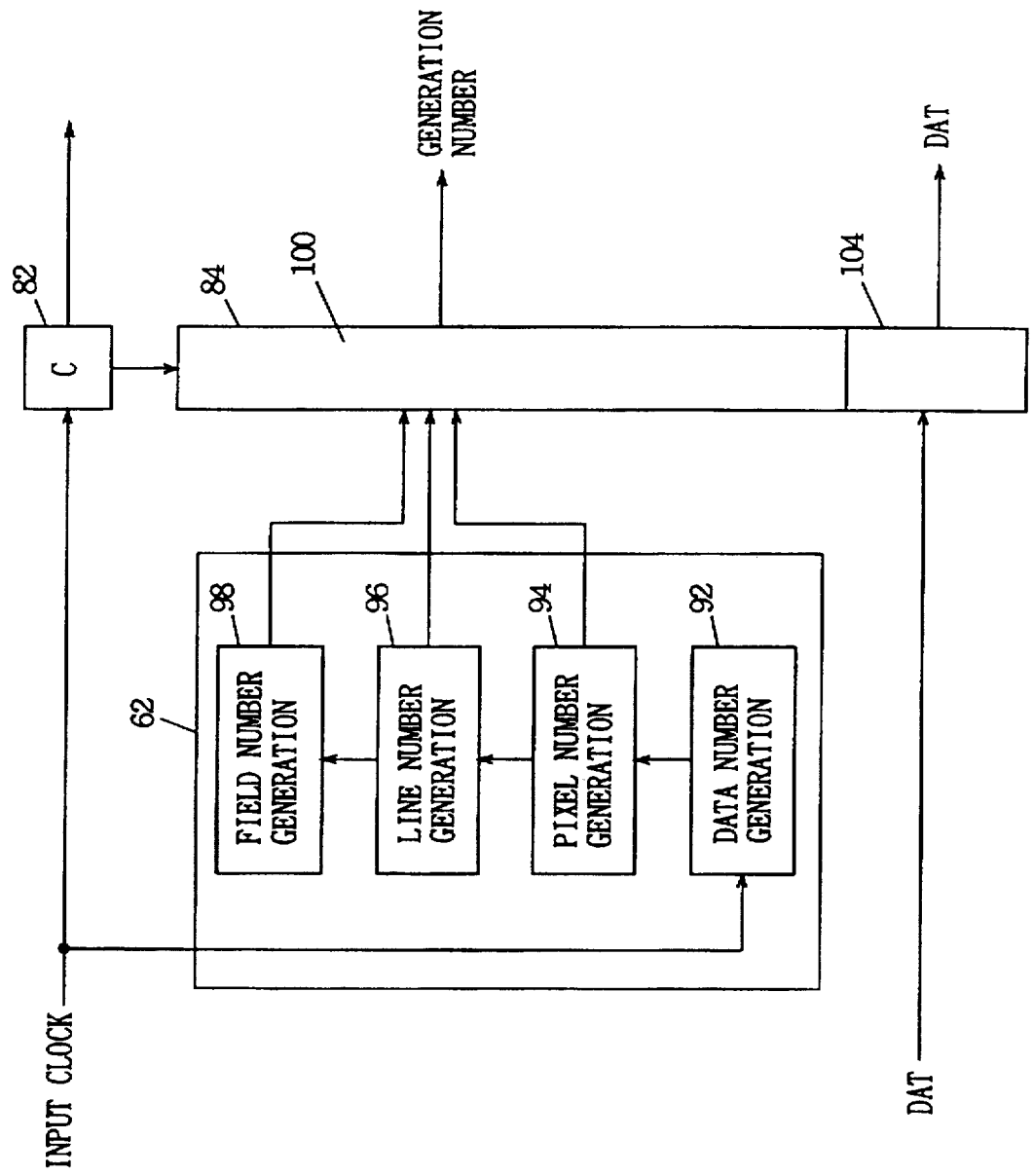
FIG. 9 is a block diagram of a generation number generation processing portion.

Referring to FIG. 9, an output of generation number generation processing portion 62 is connected with an input of a generation number register 100 of pipeline register 84 controlled by transfer control element 82. Pipeline register 84 also has a data register 104 and data DAT is applied to an input of data register 104. Transfer control element 82 causes pipeline register 84 to latch a value of its input at the timing of a rising of the input clock.

Generation number generation processing portion 62 includes a data number generating portion 92, a field number generating portion 94, a line number generating portion 96 and a pixel number generating portion 98.

Data number generating portion 92 counts an input clock starting at zero to a predetermined number and when it reaches the predetermined number, applies a clock signal to pixel number generating portion 94. When data number generating portion 92 receives the next input clock, data number generating portion 92 resets itself. In the present embodiment, the maximum value of data number generating portion 92 is two. Since the input clock is given one pulse for one application of DAT, a value of data number generating portion 92 repeatedly takes a value of 0.1 or 2 in such an order as "0, 1, 2, 0, 1, 2 . . . ".

Pixel number generating portion 94, similar to data number generating portion 92, counts the number of clocks applied from data number generating portion 92 in the range of zero to a predetermined number and applies one clock signal to line number generating portion 96. When the content reaches the predetermined number, pixel number generating portion 94 resets itself to zero at the next clock input.

Line number generating portion 96 and field number generating portion 98 are also similar to pixel number generating portion 94, except that line number generating portion 96 counts clock signals output from pixel number generating portion 94 and that field number generating portion 98 counts clock signals output by line number generating portion 96.

The maximum numbers of pixel number generating portion 94, line number generating portion 96 and field number generating portion 98 are the number of pixels in one line, the number of lines in one field and the number of fields within one frame of image information to be processed.

respectively. The contents of pixel number generating portion 94, line number generating portion 96 and field number generating portion 98 are combined and applied as a generation number to the input of generating number register 100.

Figure 10:
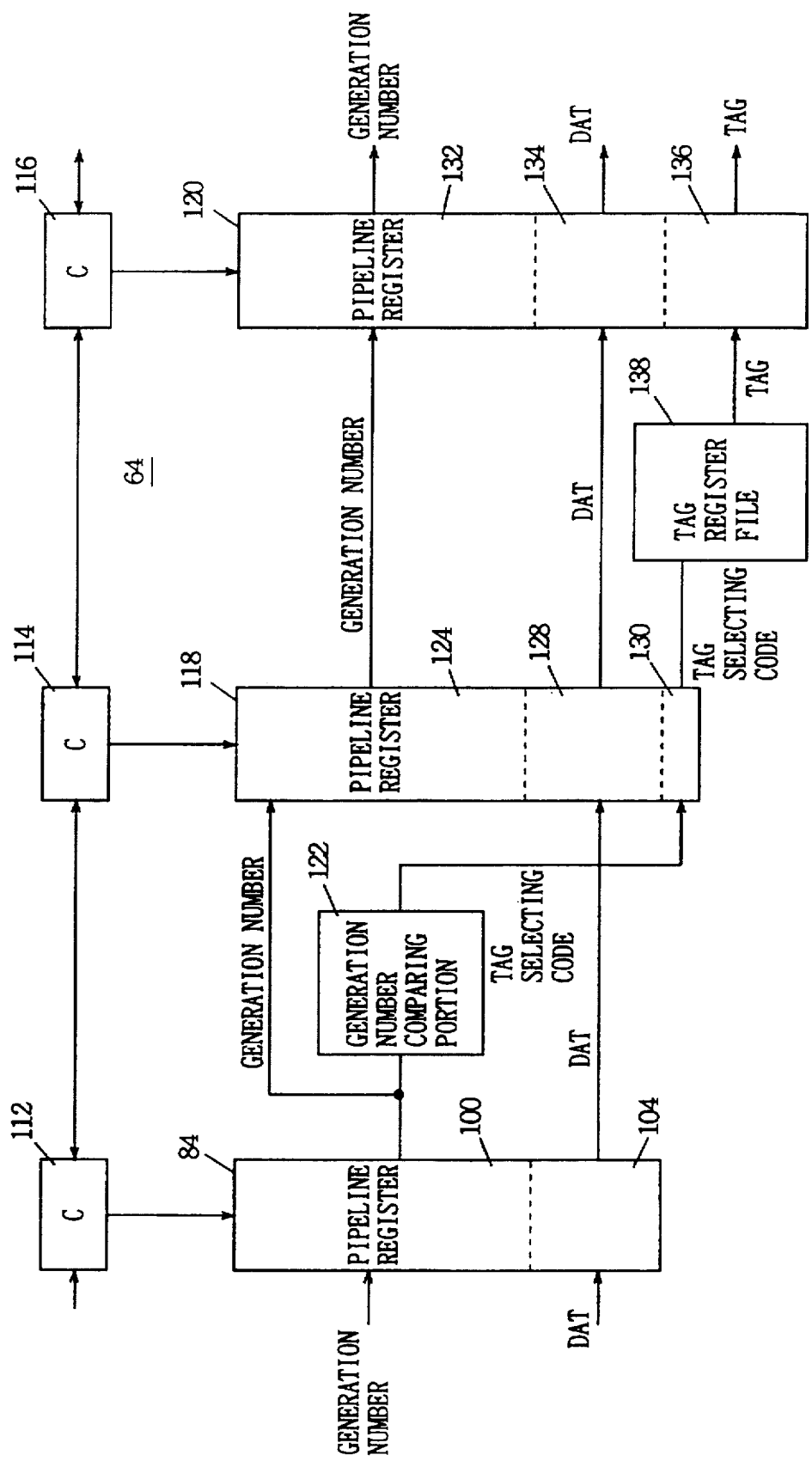
FIG. 10 is a block diagram of a tag generation processing portion.

Referring to FIG. 10, tag generation processing portion 64 is connected between pipeline registers 84 and 120 and includes a generation number comparing portion 122 and a tag register file 138. A pipeline register 118 is provided between generation number comparing portion 122 and tag register file 138. These pipeline registers 84, 188 and 120 are controlled by C elements 112, 114, and 116 and sequentially latch and transfer generation numbers, data and the like.

Pipeline register 118 includes a generation number register 124, a data register 128 and a tag selecting code register 130. Similarly, pipeline register 120 includes a generation number register 132, a data register 134 and a tag register 136.

Generation number comparing portion 122 receives a generation number from generation number register 100 and outputs a tag selecting code designating which tag to select as a function of the generation number. The tag selecting code output by generation number comparing portion 122 is applied to tag selecting code register 130. An output of generation number register 100 is also applied to generation number register 132 via a generation number register 124.

Data DAT is transmitted via data registers 104, 128 and 134 to a subsequent stage.

Tag register file 138 receives a tag selecting code from tag selecting code register 136, outputs a tag corresponding to the tag selecting code and applies the tag to tag selecting register 136. The configuration of tag register file 138 will be described later.

Figure 11:
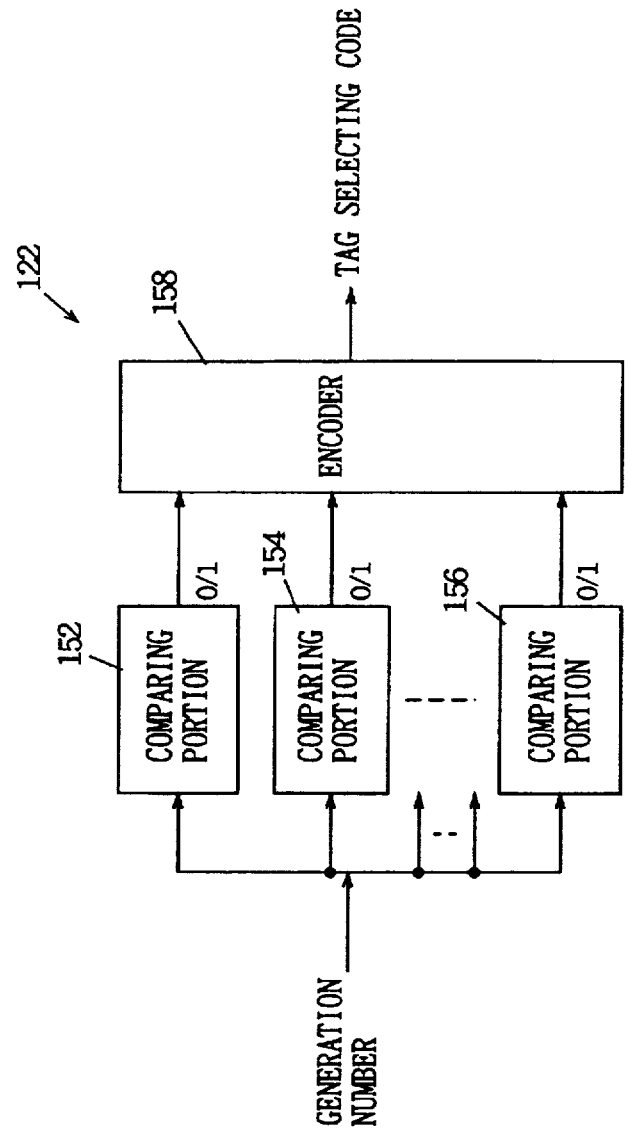
FIG. 11 is a block diagram of a generation number comparing portion.

Referring to FIG. 11, generation number comparing portion 122 includes a plurality of comparing portions 152, 154, . . . , 156 and an encoder 158. The number of comparing portions 152, 154, . . . , 156 provided is the same as that of windows described later. The "window" is any subspace within a generation number space represented by n dimensions. In the present embodiment, the generation number space is a three-dimensional space and a window is a subspace of three-dimensional rectangular parallelepiped. Comparing portions 152, 154, . . . , 156 determine whether a generation number is included in their respective windows and provide the results to encoder 158. In the present embodiment, comparing portions 152, 154, . . . , 156 output "1" if an input generation number falls within the range of each of the respective window regions set for the comparing portions and output "0" when the input generation number is out of the range of each of the respective window regions set for the comparing portions.

Encoder 158 encodes signals applied from comparing portions 152, 154, . . . , 156 and outputs a tag selecting code. When the number of windows to be set is n, a method of encoding the code sent to encoder 158 can be set such that an output of encoder 158 may have a value of at most $2^n$ different values. However, the number of possible output values may be any value of less than the maximum $2^n$ mentioned above according to the number of the tag registers.

Now, details of comparing portion 152 shown in FIG. 11 will be described with reference to FIG. 12. Since other comparing portions 154, . . . , 156 have the same configuration as comparing portion 152, a detailed description thereof will not be repeated here.

Figure 12:
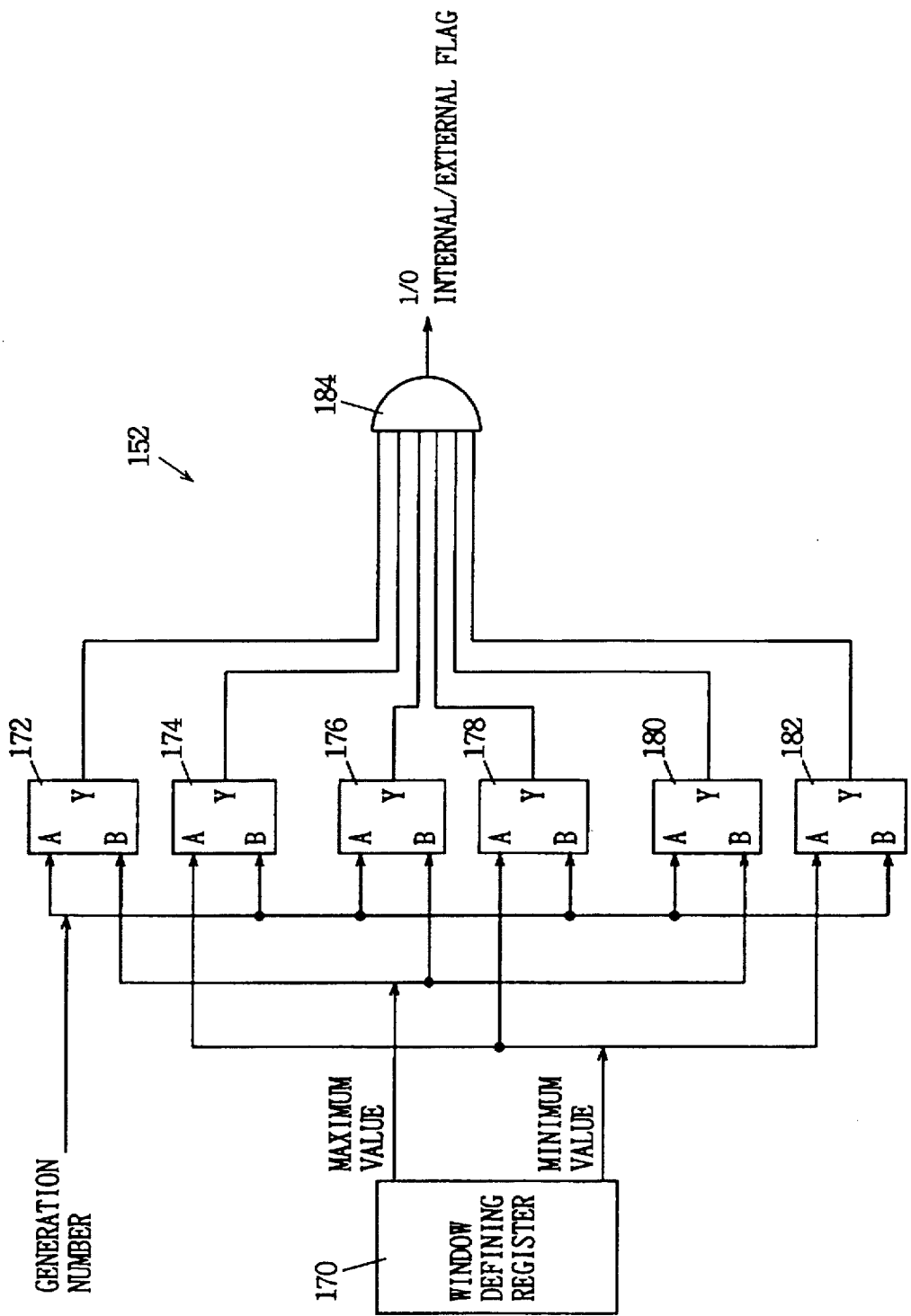
FIG. 12 is a block diagram of an encoder.

Referring to FIG. 12, comparing portion 152 includes a window defining register 170 for storing therein data defining a window for comparing portion 152, field number comparing circuits 172 and 174, line number comparing circuits 176 and 178, pixel number comparing circuits 180 and 182, and an AND circuit 184 having inputs connected to outputs of comparing circuits 172, 174, 176, 178, 180 and 182.

Window defining register 170 outputs coordinates of a vertex indicating the maximum value and of a vertex indicating the minimum value, out of coordinates in a three-dimensional subspace defining a window (a window in the shape of a rectangular parallelepiped) for comparing portion 152. Each of comparing circuits 172, 174, 176, 178, 180 and 182 has two inputs A and B and one output Y, and outputs 1 at output Y if input A$\leq$input B and outputs 0 at output Y otherwise.

A generation number is applied to inputs A of comparing circuits 172, 176 and 180 and to inputs B of comparing circuits 174, 178 and 182. Of the maximum value and the minimum value output from window defining register 170, the maximum value is applied to inputs B of field number comparing circuit 172, line number comparing circuit 176 and pixel number comparing circuit 180. The minimum value is applied to inputs A of field number comparing circuit 174, line number comparing circuit 178 and pixel number comparing circuit 182. Field number comparing circuits 172 and 174 extract field number portions of the values applied to their respective inputs A and B, respectively, and compares the field number portions with each other. Similarly, line number comparing circuits 176 and 178 extract only line number portions of the values applied to their respective inputs A and B, and each compare the line number portions. Pixel number comparing circuits 180 and 182 extract only pixel number portions of the values applied to their inputs A and B and each compare the pixel number portions.

AND circuit 184 outputs 1 when outputs applied from comparing circuits 172, 174, 176, 178, 180 and 182 are all 1's, and outputs 0 otherwise. That is, only when the field number, line number and pixel number of an applied generation number are not more than the respective maximum values and not less than the respective minimum values of field numbers, line numbers and pixel numbers stored in window defining register 170, respectively, AND circuit 184 outputs 1 and this output allows one to determine whether an allocation indicated by the generation number is within a window defined by window defining register 170. An output of AND circuit 184 is conveniently referred to as an internal/external flag.

Figure 17:
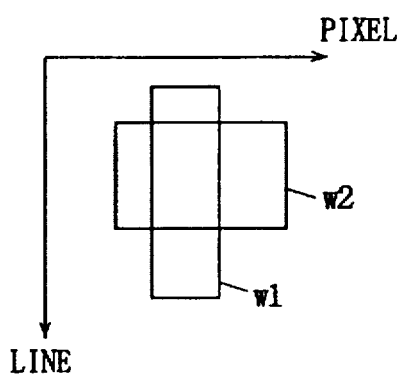
FIG. 17 schematically shows a definition of a plurality of windows.

FIG. 17 shows an example of the window. FIG. 17 shows two windows w1 and w2. In FIG. 17, as only line and pixel are shown as coordinate axes, the figure is shown being two-dimensional. However, there actually exists field number as a third dimension and each window is a subspace in the shape of a rectangular parallelepiped of a three-dimensional space in which field, line and pixel numbers serve as coordinates. In the present embodiment, it is envisioned that monochrome image data as input data is processed.

FIG. 13 shows an example of a configuration of tag register file 138 shown in FIG. 10. As shown in FIG. 13, tag register file 138 has a plurality of tags and each tag includes a destination number, an instruction and right data. These tags are prestored in tag register file 138 such that they are addressed according to tag selecting codes. By accessing tag register file 138 by addressing according to a tag selecting code output from generation number comparing portion 122, a corresponding tag (a destination number, an instruction and right data) is output. Thus, as a tag selecting code is decoded based on whether an input generation number is within preset windows and a tag is read out from tag register file 138 by addressing according to the tag selecting code, corresponding processing can be performed depending upon in which window the generation number is in.

Figure 14:
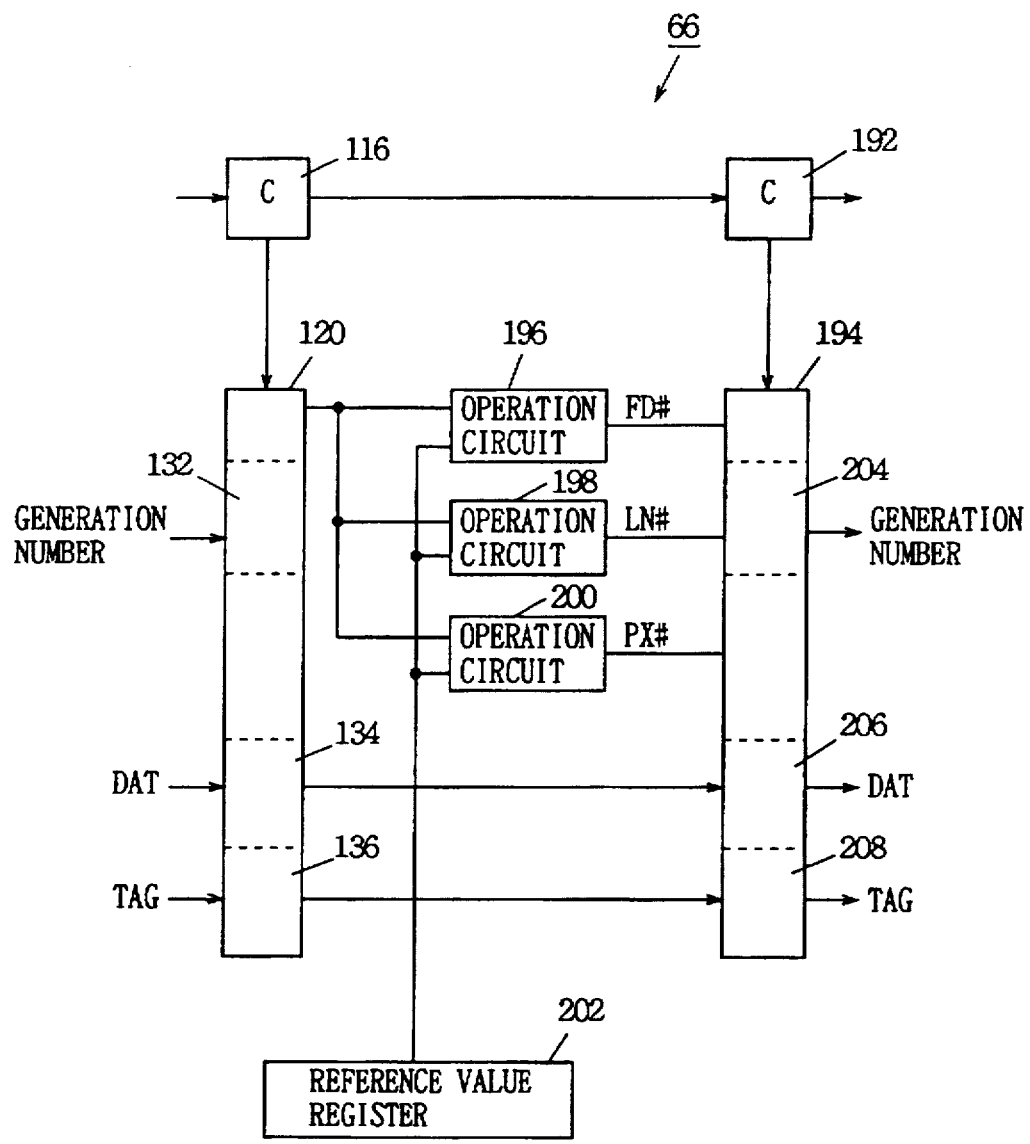
FIG. 14 is a block diagram of a generation number operation processing portion.

FIG. 14 shows generation number operation processing portion 66 shown in FIG. 8. Generation number operation processing portion 66 is provided between pipeline registers 120 and 194. Pipeline registers 120 and 194 are controlled by C elements 116 and 192, respectively, and transmit data successively.

Generation number operation processing portion 66 includes operation circuits 196, 198 and 200 for performing predetermined operations for field, line and pixel numbers of a generation number, respectively. Pipeline register 194 includes a generation number register 204, a data register 206 and a tag register 208, and outputs of operation circuits 196 198, 200 are connected with a field number portion, a line number portion and a pixel number portion of generation number register 204, respectively. A generation number is applied from a generation number register 132 of pipeline register 200 to operation circuits 196, 198 and 200. Data DAT is transferred from a data register 134 via data register 206 to a subsequent stage. A tag is transferred via tag registers 136 and 208 to the subsequent stage.

Generation number operation processing portion 66 also includes a reference value register 202 for storing therein a reference value used for operations performed in operation circuits 196, 198 and 200.

Figure 15:
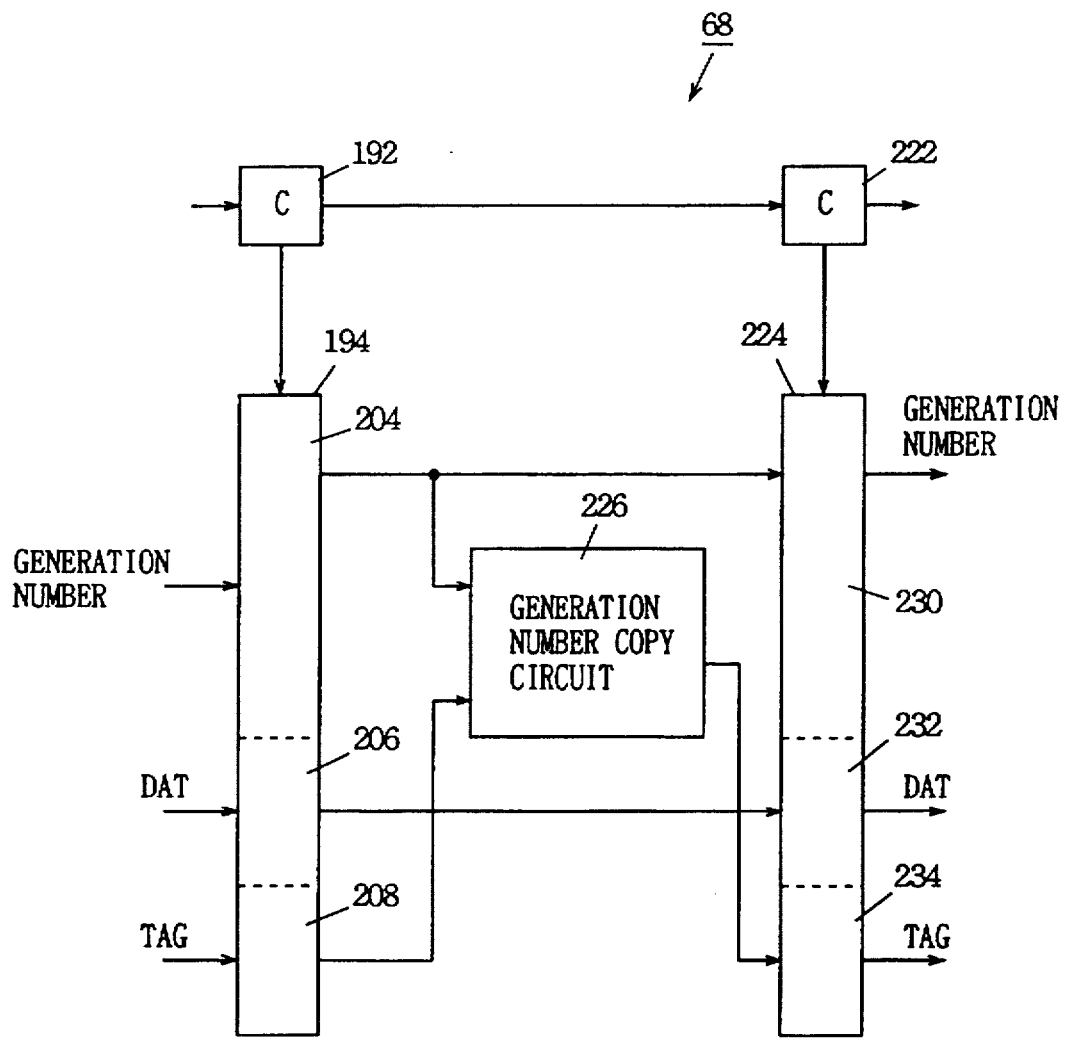
FIG. 15 is a block diagram of a copy processing portion.

FIG. 15 shows details of copy processing portion 68 shown in FIG. 8. Copy processing portion 68 is provided between pipeline register 194 described above and a pipeline register 224 in the subsequent stage. Pipeline register 224 includes a generation number register 230, a data register 232 and a tag register 234. Pipeline registers 194 and 224 are controlled by C elements 192 and 222, respectively, and successively transfer data to the subsequent stage.

Copy processing portion 68 includes a generation number copying circuit 226 for receiving a generation number and a tag from pipeline register 194 and copying a portion of the generation number into a portion of the destination number in the tag. An output of generation number copying circuit 226 is applied to tag register 234 of pipeline register 224.

Figure 16:
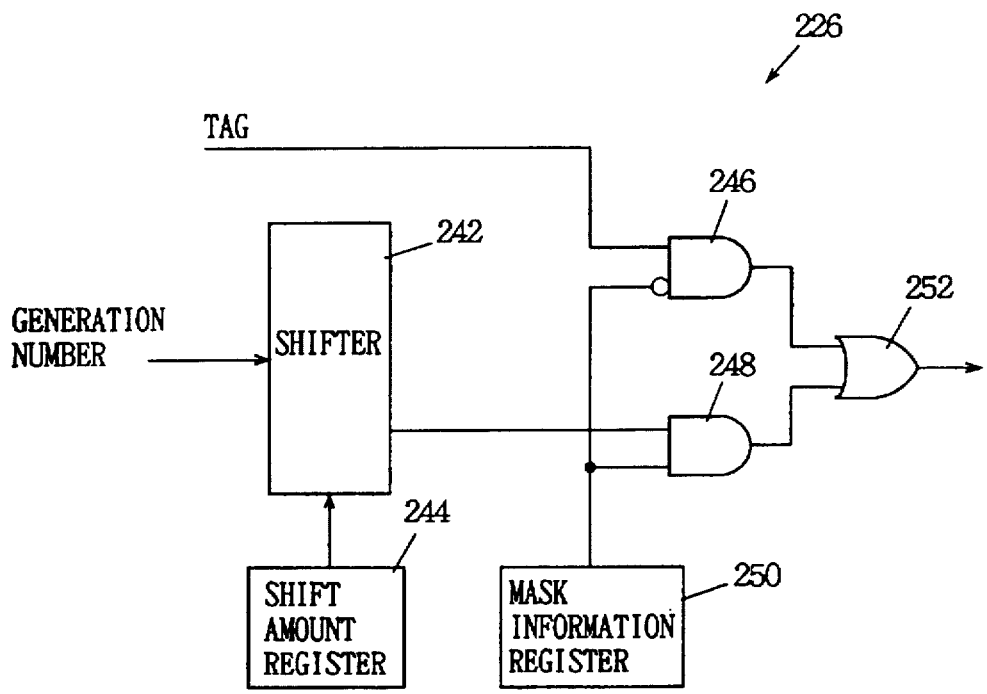
FIG. 16 is a block diagram of a generation number copying circuit.

Referring to FIG. 16, generation number copying circuit 226 includes a shifter 242 for receiving a generation number and shifting the generation number by a predetermined amount, a shift amount register 224 for prestoring therein the shift amount in shifter 242, a mask information register 250 for storing therein mask information for formation of a tag, an AND circuit 248 having one input connected with an output of shifter 242 and the other input connected with mask information register 250, an AND circuit 246 having one input to which a tag is applied and the other input to which an inverted output of mask information register 250 is applied, and an OR circuit 252 having two inputs connected with outputs of AND circuits 246 and 248.

In FIG. 16, generation number copying circuit 226 is a circuit copying a portion of a generation number into a portion of the destination number of a tag and more specifically, into a processor number portion. Since the other portions of the tag are not changed, details of circuits for the other portions of the tag are not shown in FIG. 16.

The function of generation number copying circuit 226 shown in FIG. 16 will now be schematically described. Shifter 242 shifts an applied generation number to the right/left according to a shift amount stored in shift amount register 244 and applies the shifted generation number to AND circuit 248. AND circuit 248 takes an AND of an output of mask information register 250 and an output of shifter 242 and applies it to OR circuit 252. AND circuit 246 takes an AND of an inversion of an output of mask information register 250 and a tag and applies it to OR circuit 252. Therefore, an output of OR circuit 252 is configured such that an output of shifter 242 and the value of the tag are selected for a portion corresponding to bit having the value of "1" stored in mask information register 250 and for the other portion, respectively.

In the present embodiment, it is assumed that a generation number consists of 17 bits, the destination number of a tag consists of 14 bits and that the uppermost seven bits and the lowermost seven bits of the 14 bits indicate a processor number and a node number, respectively. It is also assumed that a value stored in shift amount register 244 is a decimal number "−3" and that a value stored in mask information register 250 is a binary number "00000111000000". It is assumed that it indicates a right shift when a value of shift amount register 244 is a positive integer and that it indicates a left shift when the value of shift amount register 244 is a negative integer. In the above example, it is indicated that a generation number is shifted to the left by three bits.

Operations of the first embodiment will now be described. In the following description, since operations of pipeline registers and C elements are not so important in the present invention, details thereof will not be described here for the purpose of simplification.

Referring to FIG. 9, every time an input clock is applied, data number generating portion 92 counts it up by one count and when the count reaches two, data number generating portion 92 applies one clock to pixel number generating portion 94. In this case also, data number generating portion 92 resets its value to zero when the next input clock is applied, and starts a next cycle of counting up.

Pixel number generating portion 94 is similar to data number generating portion 92 in operation. However, pixel number generation portion 94 counts up between 0 and 1. Line number generating portion 96 and field number generating portion 98 operate similarly. In this example, both the range of line number and the range of field number are predetermined values. Outputs of pixel number generating portion 94, line number generating portion 96 and field number generating portion 98 are all applied to generation number register 100 and transmitted as a generation number to a subsequent stage. Data DAT applied simultaneously with an input clock is transmitted via data register 104 to a subsequent stage.

Referring to FIG. 10, a generation number is applied to an input of generation number comparing portion 122 and to an input of generation number register 124. Data DAT is applied via data registers 128 and 134 to the subsequent stage.

Referring to FIG. 11, comparing portions 152, 154, . . . , 156 determine whether a generation number is within their respectively defined windows, and apply to encoder 158 internal/external flags which are set to "1" when the generation number is within their respective windows and which are set to "0" when the generation number is not within their respective windows. Encoder 158 encodes the internal/external flags applied from comparing portions 152, 154, . . . , 156 and applies them as a tag selecting code via tag selecting code register 130 shown in FIG. 10 to tag register file 138.

Comparison processing which takes place in comparing portions 152, 154, ... 156 is as described with reference to FIG. 12.

Referring to FIG. 13, in tag register file 138, a corresponding tag is read out and output by addressing by a tag selecting code. The tag is applied via tag register 136 shown in FIG. 10 to operation circuits 196, 198 and 200 shown in FIG. 14.

Thus, it is determined for a plurality of windows whether a generation number is within a subspace defined by each window, a tag selecting code is determined by the decision result and a tag is read out from the tag register file according to the tag selecting code. Therefore, when processing need be changed depending on whether a generation number is within a certain window, for example, such processing can be readily performed.

Referring to FIG. 14, a generation number is applied via generation number register 132 to operation circuits 196, 198 and 200. In this example, the field number portion, line number portion and pixel number portion of the generation number are applied to operation circuits 196, 198 and 200, respectively. Operation circuits 196, 198 and 200 perform operation using a value stored in reference value register 202 for the field, line and pixel numbers, respectively, and the converted field, line and pixel numbers are applied to generation number register 204. That is, operations are separately performed for each dimension of the generation number by operation circuits 196, 198, 200.

Figure 18A:
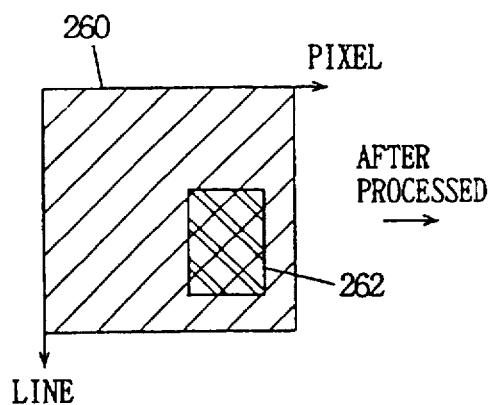
FIGS. 18A and 18B schematically show processing by which the upper left portion of a window area overlaps the origin of a display area.
Figure 18B:
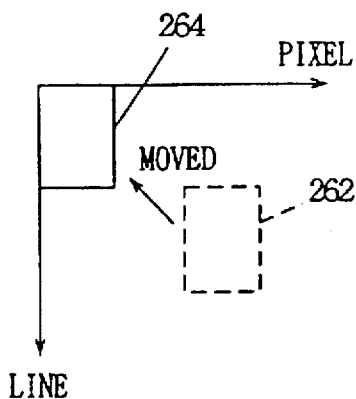

By such operations, the following conversion of the input data becomes possible. Referring to FIG. 18, it is assumed that a conversion is carried out such that the upper left point of a window area 262 shown in FIG. 18(A) may overlap the origin of a display area 260. Processing in this conversion means movement of window area 262 to the position of window area 264, as shown in FIG. 18(B). In order to apply this processing, respective certain offset amounts may be subtracted from the pixel number and line number of a generation number of each of data within window area 262. Thus, a window area can be moved to an area the upper left point of which is the origin. Such a movement allows for significant reduction in operation amount of subsequent processing, as described hereinafter.

Figure 19A:
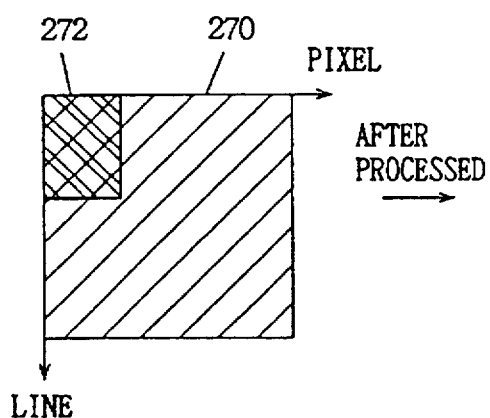
FIGS. 19A and 19B schematically show processing of enlarging a window area the upper left portion of which overlaps the origin of the display area.
Figure 19B:
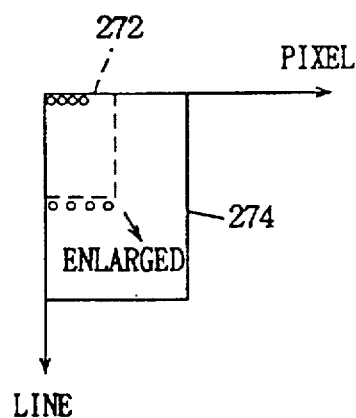

Referring to FIG. 19, assume processing of enlarging a window area 272 shown in FIG. 19(A), the upper left portion of which overlaps the origin of a display area 270 to an area 274 shown in FIG. 19(B). In this case, a pixel value and a line value of a generation number corresponding to each pixel within area 272 may be multiplied. This allows window area 272 to be enlarged to area 274 shown in FIG. 19(B). The generation number thus converted is transmitted via generation number register 204 to a subsequent stage.

Data DAT and a tag are transmitted to a subsequent stage via data registers 134 and 206 and tag registers 136 and 208, respectively.

Referring to FIGS. 15 and 16, the portion of the generation number thus converted is copied to a portion of the destination number of a tag in the following manner. Specifically referring to FIG. 16, a generation number input to shifter 242 is shifted by a predetermined number of bits specified by shift amount register 244 and applied to AND circuit 248. In the present embodiment, a generation number is shifted by three bits to the left. Furthermore, an output of shifter 242 and mask information stored in a mask information register 250 are ANDed by AND circuit 248. The mask information is a binary number "00001110000000" as mentioned above. Therefore, in an output of AND circuit 248, only portions corresponding to the bits of "1" of the mask information of a generation number shifted by three bits to the left remain and the other portions are all 0's.

AND circuit 246 ANDs an inversion of the mask information from mask information register 250 and a tag. Therefore, bit portions of "1" of the mask information are set to 0 and the other portions have the content of the tag maintained as it is. OR circuit 252 takes an OR of an output of AND circuit 246 and an output of AND circuit 248 and outputs it. Thus, an output of OR circuit 252 has portions corresponding to the bits of "1" of the mask information of the tag replaced with the portion of an generation number shifted by shifter 242.

Figure 20:
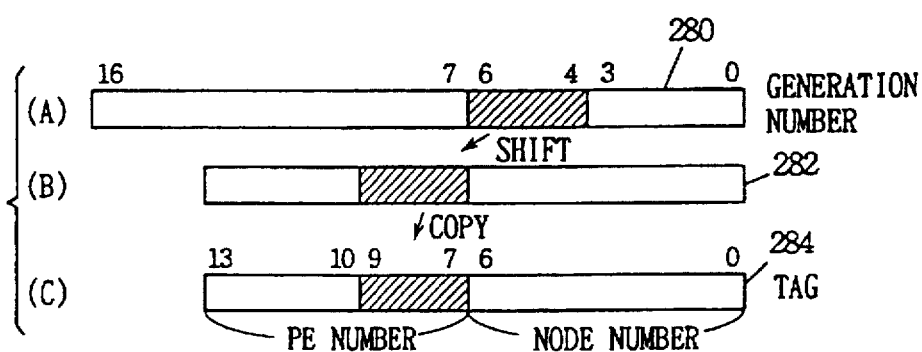
FIG. 20 schematically shows processing of copying a portion of a generation number into a portion of a destination number.

In the present embodiment, a destination number of a tag occupies 14 bits, the uppermost 7 bits and lowermost 7 bits thereof being a processor number and a node number, respectively. As shown in (A) and (B) of FIG. 20, a portion corresponding to bits 7 through 9 of a generation number 282, which is a generation number 280 shifted by three bits to the left, is copied to bits 7 through 9 of a tag 284, as shown in FIG. 20(C). The other portions of the processor number, the node number portion, and instruction information and data, which are not shown, are not changed. Data items with different bits 4 through 6 in the generation number are processed by different processors. Therefore, for image information, it becomes possible to allow a different processor to process data according to a location of the pixel on the image.

Referring to FIG. 15, after a portion of a generation number is thus copied into a portion of a tag, the tag is transferred by a tag register 234 to a subsequent stage. The generation number and the data are transferred to a subsequent stage via generation number registers 204 and 230 and data registers 206 and 232, respectively.

Thus, in a data driven processor according to the present embodiment, a different tag can be selected depending on whether a generation number is included within a predetermined window. Different processings can be readily performed on pixels included in different areas of an image.

Furthermore, a multi-dimensional generation number can be generated and a separate operation can be carried out for each dimension. Accordingly, a predetermined conversion for an image can be readily performed and processing amount in the subsequent processing can be reduced.

Furthermore, since a portion of a generation number is copied into a portion of a tag (a portion of a processor number in the above embodiment), data can be processed by different processors depending on pixel location and loads on processors can be distributed. In the above embodiment, since three bits of a generation number are copied into the processor number, load can be distributed uniformly to eight processors.

In the above embodiment, as shown in FIG. 8, tag generation processing, generation number operation processing and copy processing are carried out in this order after generation number generation processing. However, the present invention is not limited to this embodiment and only one of the tag generation processing, the generation number operation processing and the copy processing can be performed, or these processings can be combined to be performed after the generation number generation processing. In this example, the generation number operation processing can be carried out at any stage or at all stages as long as it is carried out after the generation number generation processing. Furthermore, the copy processing can be carried out at any stage or at all stages as long as it is carried out after the tag generation processing.

In the copy processing in the above embodiment, a portion of a generation number is copied into a portion of a processor number. However, the present invention is not limited to this embodiment and a portion of a generation number can be copied into the entire processor number or to a node number. Furthermore, a generation number can be copied across a processor number and a node number.

In the above generation number operation processing, subtraction and multiplication are carried out for each dimension of a generation number. However, the present invention is not limited to such operations and any operation such as addition and division or any combination of those operations may be carried out for each dimension of a generation number. Furthermore, in this operation, each dimension may be handled as a function of the three values of field, line and pixel, rather than handled independently, to determine field, line and pixel.

[Second Embodiment]

Figure 21:
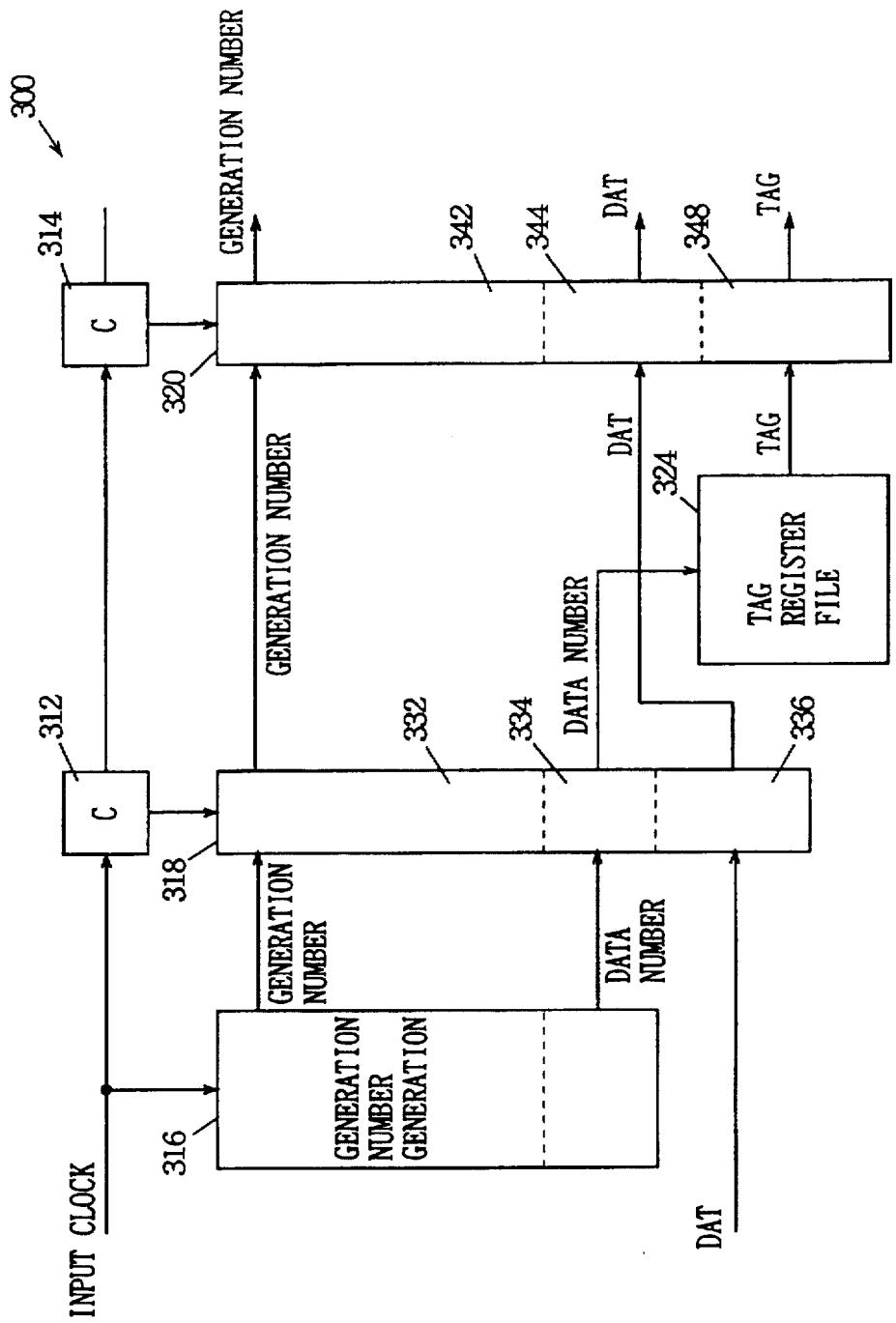
FIG. 21 is a block diagram of a data driven information processor according to a second embodiment of the present invention.

FIGS. 21–24 show a data driven processor as a second embodiment of a data processor according to the present invention. Referring to FIG. 21, a data driven processor 300 of the second embodiment includes a generation number generation processing portion 316 and a tag register file 324. A pipeline register 318 is provided between generation number generation processing portion 316 and tag register file 324 and a pipeline register 320 is provided at a subsequent stage of tag register file 324. Pipeline registers 318 and 320 are controlled by C elements 312 and 314, respectively, and latch and transfer data to subsequent stages successively.

Pipeline register 318 includes a generation number register 332 for receiving a generation number from generation number generation processing portion 316 and latching the generation number temporarily, a data number register 334 for receiving a data number from generation number generation processing portion 316 and latching the data number temporarily and a data register 336 for temporarily latching data DAT. An output of data number register 334 is applied to an input of tag register file 324.

Pipeline register 320 includes a generation number register 342 for temporarily latching a generation number received from generation number register 332, a data latch 344 for temporarily latching data DAT received from data register 336 and a tag register 348 for latching a tag output from tag register file 324.

Figure 22:
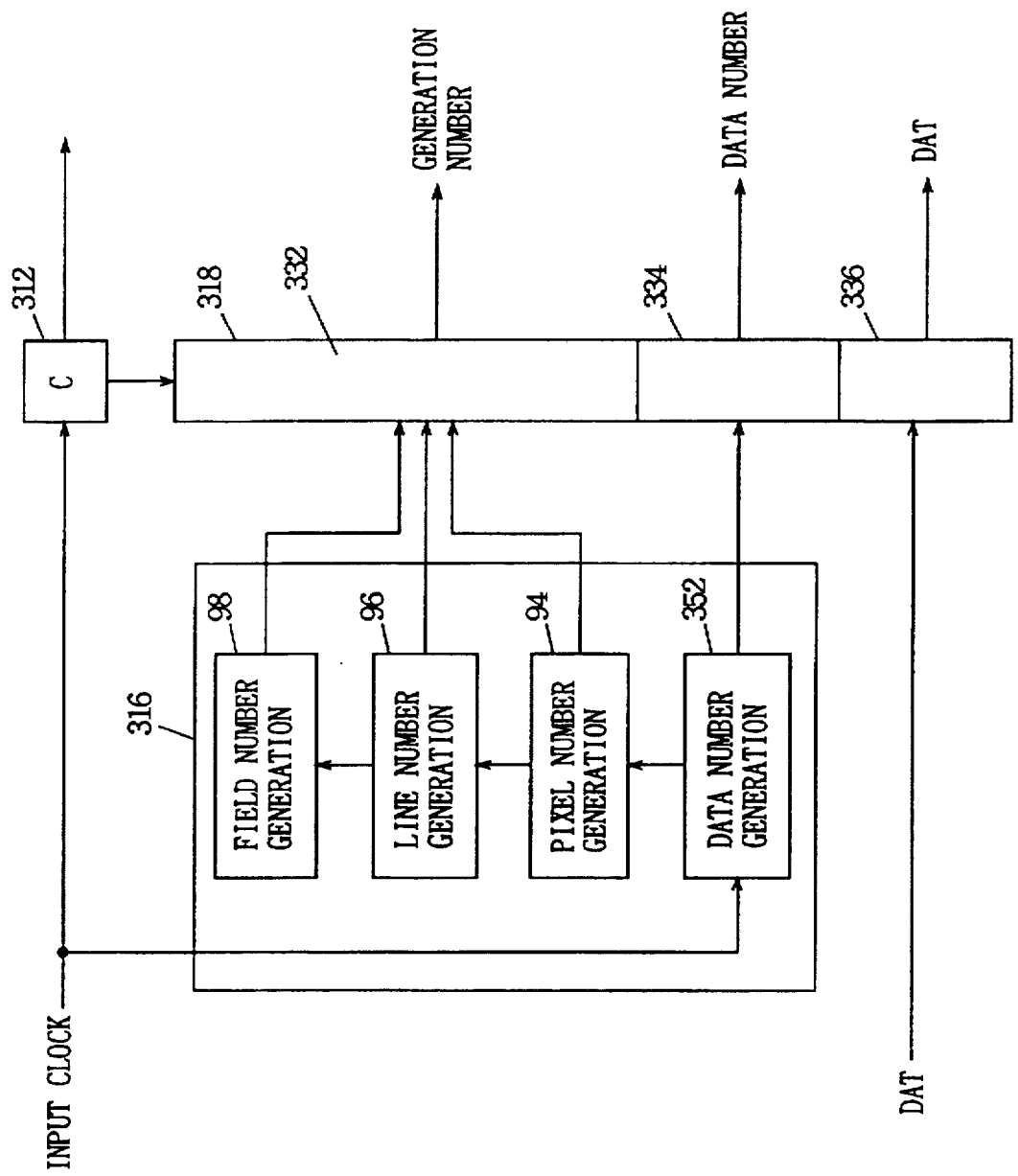
FIG. 22 is a block diagram of a generation number generation processing portion.

Referring to FIG. 22, generation number generation processing portion 316 includes a data number generating portion 352, a pixel number generating portion 94, a line number generating portion 96 and a field number generating portion 98. Of these, pixel number generating portion 94, line number generating portion 96 and field number generating portion 98 are the same as pixel number generating portion 94, line number generating portion 96 and field number generating portion 98 shown in FIG. 9. Therefore, detailed description thereof will not be repeated here.

Data number generating portion 352 is similar to data number generating portion 92 shown in FIG. 9 except that its content can be output to data number register 334. Data number generating portion 352 is otherwise the same as data number generating portion 92 of FIG. 9. Therefore, details of its operation will not be repeated here.

Data number generating portion 352 counts an input clock to generate a sequence of data numbers "0, 1, 2, 0, 1, 2, . . ." and applies the data numbers to tag register file 324 via data number register 334.

Referring to FIG. 23, tag register file 324 stores therein a plurality of tags and each tag includes a destination number, an instruction and right data. The right data is right-side input for operation performed at each node. Those tags are output from tag register file 324 by addressing according to data numbers.

A data driven processor of the second embodiment operates as follows: the left three columns of FIG. 24 indicate field, line, and pixel numbers, respectively, applied to input data. Furthermore, the central column indicates data numbers each allocated to each data. As shown in FIG. 24, the first to third data are allocated the same generation number and distinguished by their data numbers. Similarly, subsequent three successive data are allocated the same generation number and are distinguished by their data numbers.

Since a tag is read out by addressing tag register file 324 according to a data number, as shown in FIG. 23, different tags are to be added to data if the data have the same generation number but different data numbers. Thus, different processing can be performed on data according to a data number.

Figure 1:
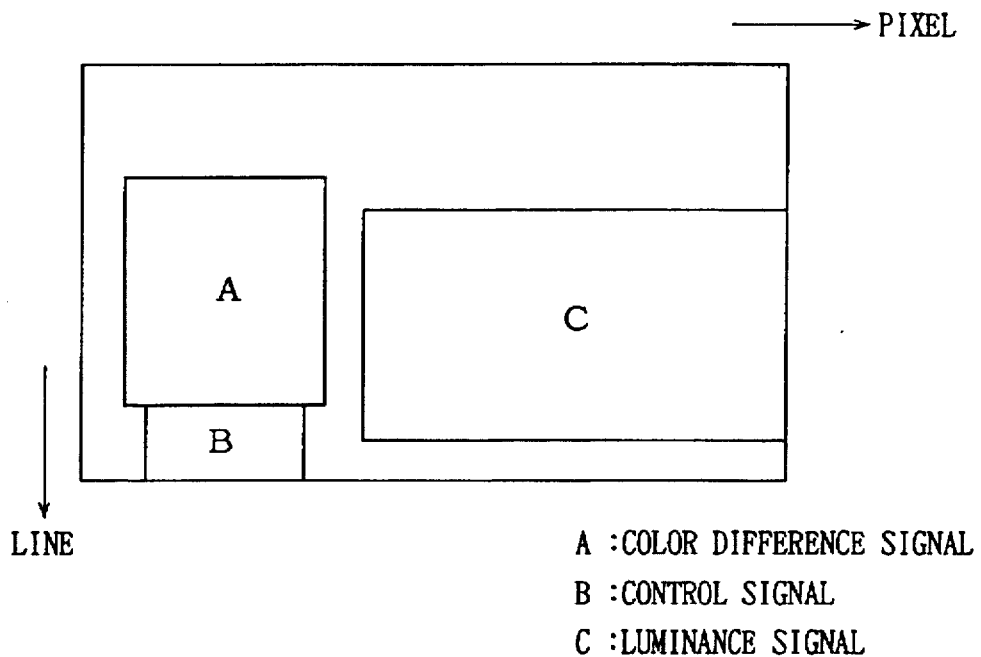
FIG. 1 schematically shows image information including separate regions each having a different meaning.
Figure 2:
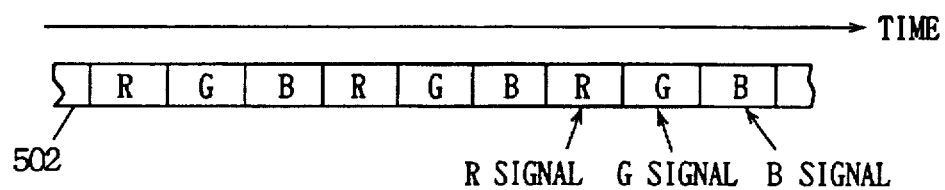
FIG. 2 schematically shows an input order of a color video signal.
Figure 3:
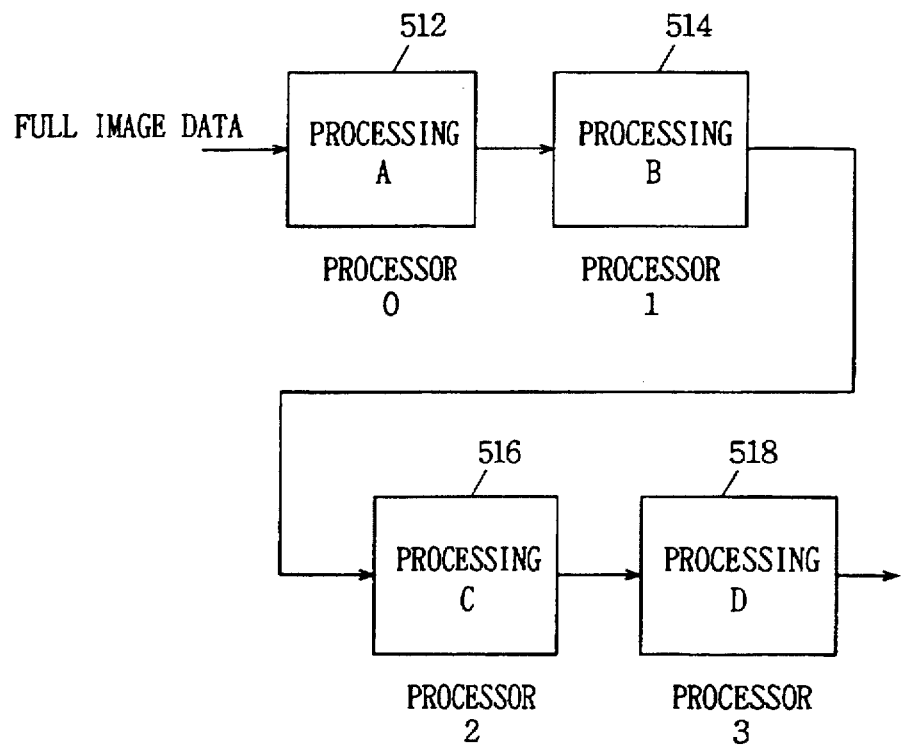
FIG. 3 schematically shows a system which processes conventional image data.
Figure 4:
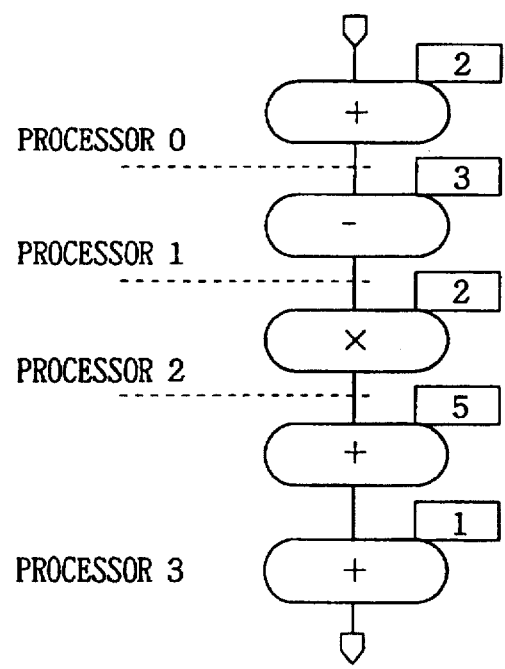
FIG. 4 is a data flow graph of processing performed on image data.
Figure 5:
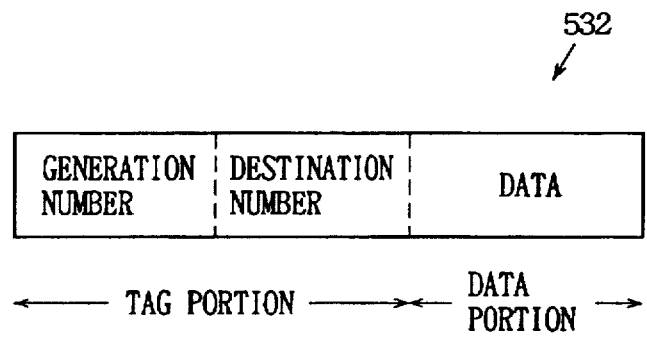
FIG. 5 schematically shows a data packet.
Figure 6:
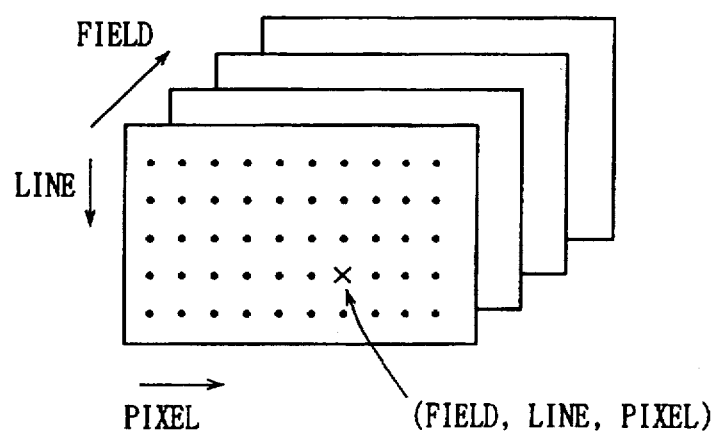
FIG. 6 is a schematic diagram illustrating an input order of image data.
Figure 26:
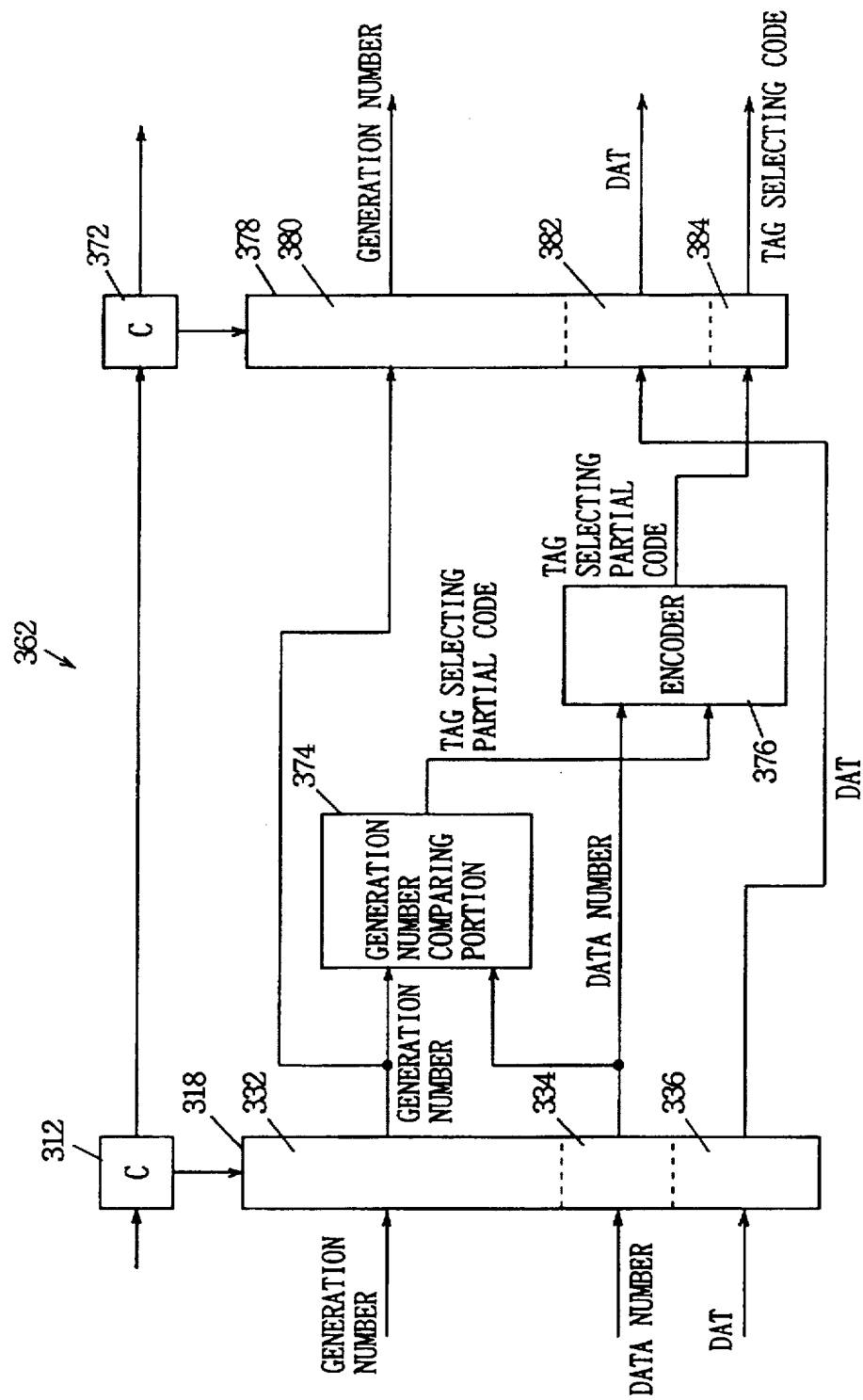
FIG. 26 is a block diagram of a data selecting code generation processing portion of the third embodiment.

This results in the following effect: referring again to FIG. 2, in the case of a color video signal, an R signal, a G signal and a B signal of a pixel are input successively. They have the same generation number. Conventionally, data having the same generation number were only provided with the same tag and it was therefore impossible to carry out different processings on R, G and B signals. However, in a data driven processor of the present embodiment, as shown in FIG. 26, since tags can be changed even for data having the same generation number according to their data numbers, separate processings can be easily carried out on R, G and B signals shown in FIG. 2.

It is obvious that this embodiment, generation number operation processing 66 and copy processing 68 described in the first embodiment can be combined.

Figure 25:
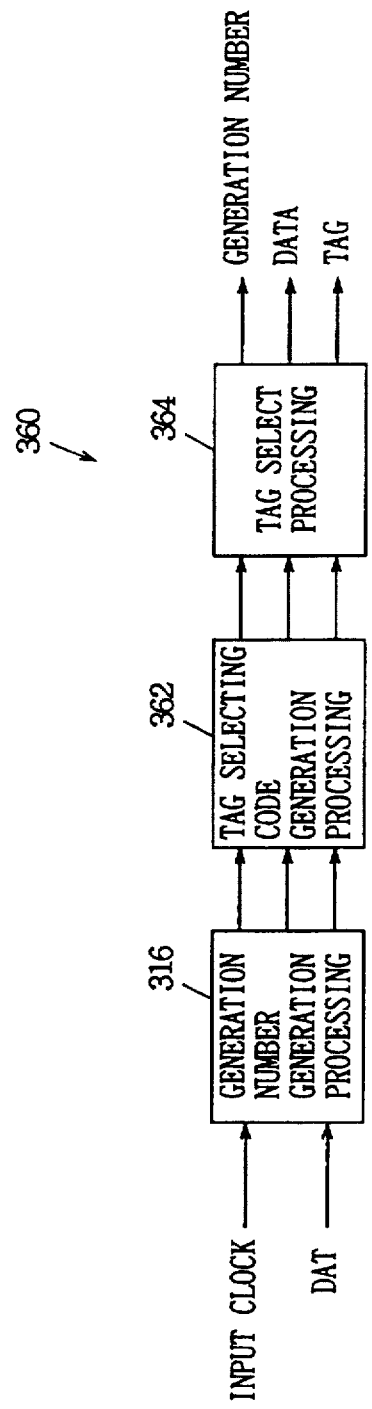
FIG. 25 is a block diagram of an input data packet forming portion of a data driven information processor according to a third embodiment of the present invention.

FIGS. 25–29 show a data driven processor according to a third embodiment of a data processor of the present invention. Referring to FIG. 25, a data driven processor 360 of the third embodiment includes a generation number generation processing portion 316, a tag selecting code generation processing portion 362 receiving an output of generation number generation processing portion 316 and generating a tag selecting code for selecting a tag and a tag selection processing portion 364 selecting a tag according to a tag selecting code generated by tag selecting code generation processing portion 362. A generation number generated by generation number generation processing portion 316, a tag selected by tag selection processing portion 364 and data DAT applied to generation number generation processing portion 316 form a packet output from tag selection processing portion 364.

Generation number generation processing portion 316 is the same as generation number generation processing portion 316 of the second embodiment shown in FIGS. 21 and 22. Therefore, a detailed description thereof will not be repeated here.

Referring to FIG. 26, tag selecting code generation processing portion 362 includes a generation number comparing portion 374 and an encoder 376 provided between two pipeline registers 318 and 378.

Pipeline register 318 includes a generation number register 332, a data number register 334 and a data register 336. Pipeline register 378 includes a generation number register 380, data register 382 and a tag selecting code register 384. Pipeline registers 318 and 378 are controlled by C elements 312 and 372 and successively transfer data to a subsequent stage.

Generation number comparing portion 374 receives a generation number and a data number from pipeline register 318, determines whether the generation number is within a predetermined window, generates a tag selecting partial code according to the determination and the data number and applies the tag selecting partial code to encoder 376. Encoder 376 encodes a tag selecting partial code applied from generation number comparing portion 374 and applies it as a tag selecting code to tag selection processing portion 364 shown in FIG. 25 via tag selecting code register 384.

Figure 27:
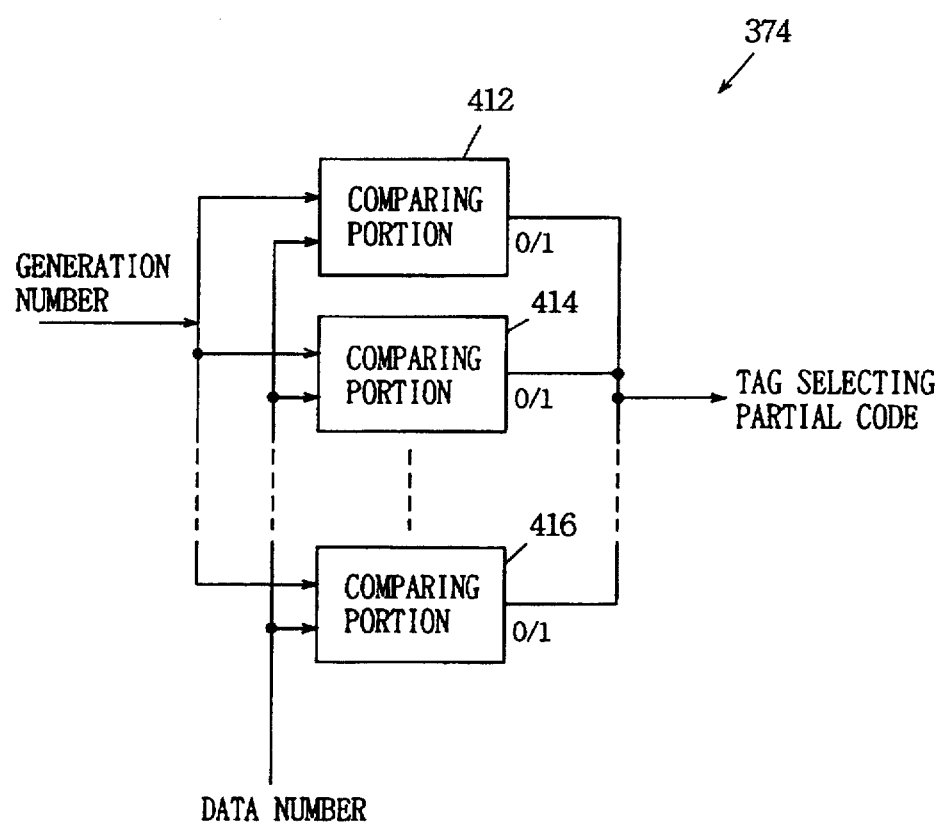
FIG. 27 is a block diagram of a generation number comparing portion.

Referring to FIG. 27, generation number comparing portion 374 includes comparing portions 412, 414, . . . , 416. The number of comparing portions 412, 414, . . . , 416 provided is that of windows by which comparison with a generation number is performed. Combined outputs of comparing portions 412, 414, . . . , 416 serve as a tag selecting partial code. Comparing portions 412, 414, . . . , 416 functions as follows: comparing portion 412, for example, prestores data for defining as many windows as the number of predetermined possible different values of the data number. Comparing portion 412 determines whether an applied generation number falls within a window designated by the data number, and if the generation number falls within the window, comparing portion 412 outputs "1" and if the generation number does not fall within the window, comparing portion 412 outputs "0" as an internal/external flag. The functions of other comparing portions 414, . . . . 416 are the same as that of comparing portion 412.

Referring to FIG. 28, comparing portion 412 includes field number comparing circuits 422 and 424, line number comparing circuits 426 and 428, pixel number comparing circuits 430 and 432, and an AND circuit 436 receiving outputs of comparing circuits 422, 424, 426, 428, 430 and 432. Comparing portion 412 also includes a window defining register 434 prestoring therein data defining as many windows as the number of possible different values of the data number.

Comparing circuits 422, 424, 426, 428, 430 and 432 are exactly the same as comparing circuits 172, 174, 176, 178, 180 and 182 shown in FIG. 12. For example, comparing circuit 422 has inputs A and B and an output Y. Comparing circuit 422 outputs "1" when input A≦input B at output Y. The other comparing circuits have the similar function.

Window defining register 434 outputs values of vertexes indicating the maximum and minimum values of a window (a three-dimensional subspace in the shape of a rectangular parallelepiped) corresponding to an applied data number. The maximum value is applied to inputs B of field number comparing circuit 422, line number comparing circuit 426 and pixel number comparing circuit 430. The minimum value is applied to inputs A of field number comparing circuit 424, line number comparing circuit 428 and pixel number comparing circuit 432.

A generation number is applied to inputs A of field number comparing circuit 422, line number comparing circuit 426 and pixel number comparing circuit 430 and to inputs B of field number comparing circuit 424, line number comparing circuit 428 and pixel number comparing circuit 432.

Field number comparing circuits 422 and 424 extract those portions of the value applied to their respective inputs A and B which correspond to field number, and compare the extracted portions. Line number comparing circuits 426 and 428 compare those portions of the value applied to their respective inputs A and B which correspond to line number. Pixel number comparing circuits 430 and 432 compare those portions of the value applied to their respective inputs A and B which correspond to pixel number.

Thus, when outputs of comparing circuits 422, 424, 426, 428, 430 and 432 are all "1", AND circuit 436 outputs "1", indicating that a generation number exists within a window designated by a data number. Otherwise, an output of AND circuit 436 is "0".

Referring again to FIG. 27, combined internal/external flags which are each output bit by bit from each of comparing portions 412, 414, . . . , 416 are a tag selecting partial code. Referring to FIG. 29, a tag selection processing portion 364 includes a tag register file 402 provided between pipeline registers 378 and 394.

Pipeline register 378 includes a generation number register 380, a data register 382 and a tag selecting code register 384. Pipeline register 394 includes a generation number register 396, a data register 398 and a tag register 400. Pipeline registers 378 and 394 are controlled by C elements 372 and 392, respectively, and transfer data applied from a previous stage to a subsequent stage.

Tag register file 402 is similar to tag register file 138 shown in FIGS. 10 and 13 and is accessed according to a tag selecting code from tag selecting code register 384 as an address so that a corresponding tag is applied to tag register 400.

A generation number and data DAT are transferred to a subsequent processing portion via generation number registers 378 and 394 and data registers 382 and 398, respectively.

The operations of a data driven processor of the third embodiment is as follows: referring to FIG. 25, generation number generation processing portion 316 successively generates generation numbers for applied data and applies the generation numbers to tag selecting code generation processing portion 360. The generation numbers generated are the same as those indicated in the leftmost three columns of FIG. 24. Generation number generation processing portion 316 also generates data numbers within the same generation number and applies the data numbers to tag selecting code generation processing portion 362. The data numbers are also the same as those indicated in the central column of FIG. 24.

Referring to FIGS. 26–28, each of comparing portions 412, 414, . . . , 416 determines whether a pixel of an applied generation number falls within a window corresponding to the applied data number and outputs a determination result. Combined, output internal/external flags are a tag selecting partial code and it is encoded into a tag selecting code by encoder 376 shown in FIG. 26 to be applied to tag register file 402 (shown in FIG. 29). Tag register file 402 outputs a tag addressed by the applied tag selecting code. When encoding, at most $2^{(n+m)}$ different values can be output, wherein the number of windows is n and the data number is m-bit length, and any number of different values may be provided as encoded outputs according to the number of the tag registers.

With a data driven processor of the third embodiment, the following effect can be obtained. It may be required to perform the processings of: defining windows W1 and W2 for R signal; defining windows w3 and w4 for G signal; defining windows w5 and w6 for B signal, as shown in FIGS. 30A–C; and determining whether a generation number is within the respective windows independently defined for the signals and applying separate processings according to the determination result. Conventionally, it was impossible to perform such processings.

However, a data driven processor of the third embodiment allocates different data numbers to data having the same generation number. Thus, any of the three types of the definitions of the windows shown in FIGS. 30A-C can be selected according to the data numbers. Furthermore, by comparing a generation number with a window definition thus selected, it can be determined whether the generation number falls within each window and according to the decision result, a different tag can be selected. Thus, it is possible to define windows separately for R, G and B signals, as shown in FIG. 30 and to carry out different processing depending on whether a generation number is within or out of the windows.

It is obvious to those skilled in the art that a data driven processor of the third embodiment can be used in combination with the generation number operation processing portion and copy processing portion described in the first embodiment.

As described above, according to the present invention, since a tag is defined as a function of a generation number, a destination of a packet can be changed according to the generation number and different processings can be carried out on data of different generations. When data of different generation numbers have different meanings, appropriate processing for each of the data can be carried out. For example, a tag can be readily generated by prestoring tag information in a tag register file serving as tag storing means such that the tag information is associated with at least a portion of generation numbers. By having a different piece of destination information included in tag information according to an input order of data, appropriate processing can be carried out on each of the data when meanings of the data are different depending on an order of the data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven information processor processing input data based on a data flow program including destination information and instruction information, said destination information including a generation number for distinguishing groups of data from one another and a destination number for distinguishing data within a same group of data from one another, comprising:

data packet forming means for forming a data packet having input data and a tag including a generation number, a destination number, instruction information and a constant value in response to external input of the data;

program storing means for storing therein a data flow program and for reading out instruction information and a next destination information from said stored data flow program based on destination information included in an applied data packet for addition to said applied data packet;

composite data generating means for receiving a data packet output from said program storing means and generating a composite data packet including an instruction for which all data required for execution of an instruction are available, data required for execution of the instruction and destination information included in a data packet including said instruction;

operation processing means for operating on data included in a composite data packet output from said composite data generating means according to instruction information included in the composite data packet output from said composite data generating means and outputting a data packet including an operation result; and output means for receiving a data packet output from said operation processing means and a data packet output from said data packet forming means and selectively outputting each data packet to either said program storing means or the outside according to destination information included in each data packet;

said data packet forming means including:

generation number generating means for generating a multi-dimensional generation number to be added to input data based on an order of the data;

tag generating means for generating a tag as a function of a generation number generated by said generating number generating means; and data combining means for combining a tag generated by said tag generating means with input data to assemble a data packet for application to said output means.

2. The data driven information processor according to claim 1, wherein said tag generating means includes tag storing means for storing therein a plurality of kinds of pieces of tag information associated with at least a portion of a generation number and for outputting tag information associated with said at least a portion of the generation number when said at least a portion of the generation number is applied thereto.

3. The data driven information processor according to claim 2, further comprising copying means connected with said tag generating means and said generation number generating means for copying a predetermined portion of a generation number output from said generation number generating means into at least a portion of a destination number of tag information generated by said tag generating means.

4. The data driven information processor according to claim 3, further comprising converting means for converting a generated generation number by performing a predetermined operation for each dimension.

5. The data driven information processor according to claim 1, wherein said generation number generating means also generates respective separate data numbers for a plurality of data belonging to the same generation, and wherein said tag generating means includes tag adding means for storing therein a plurality of types of pieces of tag information associated with respective data numbers and, when a data number is applied thereto from said generating number generating means, for outputting tag information associated with said applied data number.

6. The data driven information processor according to claim 5, further comprising copying means connected with said tag generating means and said generation number generating means for copying a predetermined portion of a generation number output from said generation number generating means into at least a portion of a destination number of tag information generated by said tag generating means.

7. The data driven information processor according to claim 6, further comprising converting means for converting a generated generation number by performing a predetermined operation for each dimension.

8. The data driven information processor according to claim 1, wherein said generation number generating means also generates respective separate data numbers for a plurality of data belonging to the same generation, and wherein said tag generating means includes tag storing means for storing therein a plurality of kinds of pieces of tag information associated with respective generation numbers and respective data numbers and, when a generation number and a data number are applied thereto from said generation number generating means, for outputting tag information associated with said applied generation number and data number.

9. The data driven information processor according to claim 8, further comprising copying means connected with said tag generating means and said generation number generating means for copying a predetermined portion of a generation number output from said generation number generating means into at least a portion of a destination number of tag information generated by said tag generating means.

10. The data driven information processor according to claim 9, further comprising converting means for converting a generated generation number by performing a predetermined operation for each dimension.

11. The data driven information processor according to claim 1, further comprising copying means connected with said tag generating means and said generation number generating means for copying a predetermined portion of a generation number output from said generation number generating means into at least a portion of a destination number of tag information generated by said tag generating means.

12. The data driven information processor according to claim 11, further comprising converting means for converting a generated generation number by performing a predetermined operation for each dimension.

13. The data driven information processor according to claim 1, further comprising converting means for converting a generated generation number by performing a predetermined operation for each dimension.

14. The data driven information processor according to claim 1, wherein said tag generating means comprises:

generation number comparing means, responsive to an applied multi-dimensional generation number, for outputting information indicating a comparison result of said multi-dimensional generation number with a plurality of predetermined conditions; and tag register file means for prestoring therein a plurality of kinds of pieces of tag information and, in response to said information indicating a comparison result, for outputting a corresponding piece of tag information.

15. The data driven information processor according to claim 1, wherein said generation number generating means comprises:

data number generating means for generating respective separate data numbers for a plurality of data belonging to the same generation; and generation number generating means for generating a multi-dimensional generation number for each of data based on an output of said data number generating means, and wherein said tag generating means comprises:

generating number comparing means for outputting information indicating a comparison result of an applied generation number and an applied data number with a plurality of predetermined conditions; and tag register file means for prestoring therein a plurality of kinds of pieces of tag information and outputting corresponding tag information when said information indicating a comparison result from said generation number comparing means is applied thereto.

16. A data driven processor comprising:

a data packet forming portion forming a data packet having a tag including at least destination information, and input data in response to external input of the data;

a program storing portion adding to a data packet an instruction and next destination information respectively determined according to a tag of the data packet and a predetermined program when said data packet is applied thereto;

a paired data generating portion for receiving data packets from said program storing portion and generating a composite data packet including an instruction for which all data required for execution of an instruction are available, data required for execution of the instruction and destination information for a result of the execution;

an operation processing portion executing an instruction in a composite data packet from said paired data generating portion and outputting a data packet including an operation result and destination information for the operation result; and an input/output controlling portion for receiving a data packet from said operation processing portion and a data packet from said data packet forming portion and selectively outputting each data packet to either said program storing portion or the outside according to destination information included in each data packet;

said data packet forming portion including a generation number generation processing portion for generating a multi-dimensional generation number to be added to input data based on an order of the input data, a tag generation processing portion for generating a tag as a function of a multi-dimensional generation number generated by said generation number generation processing portion, and a data combination processing portion for combining a tag generated by said tag generation processing portion with input data to assemble a data packet for application to said input/output controlling portion.

17. The data driven processor according to claim 16, wherein said tag generation processing portion includes:

a generation number comparing portion responsive to an applied multi-dimensional generation number for outputting information indicating a comparison result of said multi-dimensional generation number with a plurality of predetermined condition; and a tag register file for prestoring therein a plurality of kinds of pieces of tag information and, in response to said information indicating a comparison result, for outputting a corresponding pieces of tag information.

18. The data driven processor according to claim 16, wherein said generation number generation processing portion includes:

a data number generating portion generating respective separate data numbers for a plurality of data belonging to the same generation; and a generation number generating portion for generating a multi-dimensional generation number for each of data based on an output of said data number generating portion, and wherein said tag generation processing portion includes a tag register file for prestoring therein a plurality of kinds of pieces of tag information each being associated with a data number and for outputting corresponding tag information when a data number is applied thereto from said generation number generation processing portion.

19. The data driven processor according to claim 16, wherein said generation number generation processing portion includes:
   a data number generating portion generating respective separate data numbers for a plurality of data belonging to the same generation; and
   a generation number generating portion for generating a multi-dimensional generation number for each of data based on an output of said data number generating portion, and wherein said tag generation processing portion includes:
      a generation number comparing portion for outputting information indicating an comparison result of an applied generation number and an applied data number with a plurality of predetermined conditions; and
      a tag register file for prestoring therein a plurality of kinds of pieces of tag information and outputting corresponding tag information when said information indicating a comparison result from said generation number comparing portion is applied thereto.

20. The data driven processor according to claim 16, further comprising a copy processing portion connected with said tag generation processing portion and said generation number generation processing portion for copying a predetermined portion of a generation number output from said generation number generation processing portion into at least a portion of a destination number of tag information generated by said tag generation processing portion.

21. The data driven processor according to claim 16, further comprising a plurality of operation circuits for converting a generation number by performing a predetermined operation for each dimension of a generated generation number.

22. A method of data driven processing input data based on a data flow program including destination information and instruction information, said destination information including a generation number for distinguishing groups of data from one another and a destination number for distinguishing data within a same group of data from one another, comprising:
   forming a data packet having input data and a tag including a generation number, a destination number, instruction information and a constant value in response to external input of the data;
   storing a data flow program in a memory and reading out instruction information and a next destination information from said stored data flow program based on destination information included in an applied data packet for addition to said applied data packet;
   generating, in response to a data packet output from said storing, a composite data packet including an instruction for which all data required for execution of an instruction are available, data required for execution of the instruction and destination information included in a data packet including said instruction;
   operating on data included in a composite data packet from said generating composite data according to instruction information included in the composite data packet and outputting a data packet including an operation result; and selectively outputting, in response to a data packet output from said operating and a data packet output from said forming, each data packet to either the memory or the outside according to destination information included in each data packet;
   said forming including:
      generating a multi-dimensional generation number to be added to input data based on an order of the data;
      generating a tag as a function of the multi-dimensional generation number; and
      combining the tag with input data to assemble a data packet for application to said selectively outputting.

23. The method according to claim 22, wherein said generating of the tag includes storing a plurality of kinds of pieces of tag information associated with at least a portion of a generation number and outputting tag information associated with said at least a portion of the generation number when said at least a portion of the generation number is applied thereto.

24. The method according to claim 23, further comprising copying, in response to the tag and the generation number, a predetermined portion of the generation number into at least a portion of a destination number of the tag information.

25. The method according to claim 23, wherein said generating of the generation number includes generating respective separate data numbers for a plurality of data belonging to the same generation, and wherein
   said generating of the tag includes storing a plurality of types of pieces of tag information associated with respective data numbers and, when a data number is applied thereto from said generating of the generation number, outputting tag information associated with said applied data number.

26. The method according to claim 22, further comprising converting the generation number by performing a predetermined operation for each dimension.

27. The method according to claim 22, wherein said generating of the tag comprises:
   comparing, in response to an applied multi-dimensional generation number, said multi-dimensional generation number with a plurality of predetermined conditions and outputting information indicating a comparison result; and
   prestoring a plurality of kinds of pieces of tag information and, in response to said information indicating a comparison result, for outputting a corresponding piece of tag information.

28. The method according to claim 22, wherein said generating of the generation number comprises:
   generating respective separate data numbers for a plurality of data belonging to the same generation; and
   generating the multi-dimensional generation number for each of data based on an output of said data numbers, and
   wherein said generating of the tag comprises:
      comparing an applied generation number and an applied data number with a plurality of predetermined conditions and outputting information indicating a comparison result; and
      prestoring a plurality of kinds of pieces of tag information and outputting corresponding tag information in response to said information indicating a comparison result.

* * * * *